United States Patent
Sanchez De la Rosa et al.

(10) Patent No.: US 12,367,473 B2
(45) Date of Patent: Jul. 22, 2025

(54) VERSATILE POINT-OF-SALE SYSTEMS AND METHODS

(71) Applicant: PayPal, Inc., San Jose, CA (US)

(72) Inventors: Mario Fernando Sanchez De la Rosa, Stockholm (SE); Ida Ristner, Stockholm (SE)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/404,847

(22) Filed: Jan. 4, 2024

(65) Prior Publication Data

US 2024/0220955 A1 Jul. 4, 2024

Related U.S. Application Data

(63) Continuation of application No. 16/990,538, filed on Aug. 11, 2020, now Pat. No. 11,887,092.

(51) Int. Cl.
| | |
|---|---|
| *G06Q 20/24* | (2012.01) |
| *G06F 1/16* | (2006.01) |
| *G06Q 20/20* | (2012.01) |
| *G06Q 20/32* | (2012.01) |
| *H02J 7/00* | (2006.01) |
| *H04W 4/80* | (2018.01) |
| *H04W 12/06* | (2021.01) |
| *H04W 12/50* | (2021.01) |
| *G06Q 20/22* | (2012.01) |

(52) U.S. Cl.
CPC ......... *G06Q 20/206* (2013.01); *G06F 1/1632* (2013.01); *G06Q 20/204* (2013.01);
(Continued)

(58) Field of Classification Search
CPC .............. G06Q 20/206; G06Q 20/204; G06Q 20/3226; G06Q 20/3278; G06Q 20/202;
(Continued)

(56) References Cited

U.S. PATENT DOCUMENTS

| | | |
|---|---|---|
| 9,928,501 B1 | 3/2018 | Edwards |
| 2013/0144731 A1 | 6/2013 | Baldwin et al. |

(Continued)

FOREIGN PATENT DOCUMENTS

| | | |
|---|---|---|
| CN | 1647120 A | 7/2005 |
| CN | 105531728 A | 4/2016 |

(Continued)

OTHER PUBLICATIONS

Extended European Search Report for European Application No. 21856419.3, mailed on Aug. 8, 2024, 9 pages.

(Continued)

*Primary Examiner* — Garcia Ade
(74) *Attorney, Agent, or Firm* — HAYNES AND BOONE, LLP

(57) ABSTRACT

Systems and methods related to point-of-sale devices are disclosed. In an embodiment, a point-of-sale system includes a base stand having a receiving interface that includes first electrical contacts. The POS system may further include a computing device having a user interface, a docking interface comprising second electrical contacts, wherein the docking interface is configured to removably dock the computing device to the receiving interface of the base stand such that the first electrical contacts of the computing device are in contact with the second electrical contacts of the base stand. The computing device may further include a card reader configured to receive and read a card when inserted into the card reader and a scanner configured to scan machine-readable codes. The computing device may be configured to extend or enable various functions of the base stand when the computing device is docked to the base stand.

20 Claims, 13 Drawing Sheets

(52) U.S. Cl.
CPC ..... *G06Q 20/3226* (2013.01); *G06Q 20/3278* (2013.01); *H02J 7/0044* (2013.01); *H04W 4/80* (2018.02); *H04W 12/06* (2013.01); *H04W 12/50* (2021.01)

(58) Field of Classification Search
CPC ............. G06Q 20/208; G06Q 20/4014; G06Q 20/40145; G06F 1/1632; G06F 1/1626; G06F 1/1658; G06F 1/1671; G06F 1/1684; G06F 1/1686; H02J 7/0044; H04W 4/80; H04W 12/06; H04W 12/50; G07G 1/0081; H04L 63/105; H04L 63/08
USPC .......................................................... 705/18
See application file for complete search history.

(56) References Cited

U.S. PATENT DOCUMENTS

| | | | | |
|---|---|---|---|---|
| 2014/0120910 | A1* | 5/2014 | Batada | H04B 5/00 455/435.1 |
| 2015/0001291 | A1* | 1/2015 | Govindarajan | G06Q 20/208 235/380 |
| 2016/0308371 | A1* | 10/2016 | Locke | G06K 19/0704 |
| 2017/0140363 | A1 | 5/2017 | Hicks | |
| 2020/0058008 | A1* | 2/2020 | Hicks | G06K 7/0004 |
| 2020/0201388 | A1* | 6/2020 | Spyrison | F16M 11/10 |

FOREIGN PATENT DOCUMENTS

| | | |
|---|---|---|
| CN | 106462840 A | 2/2017 |
| KR | 2012-0095143 | 8/2012 |
| KR | 2013-0004768 | 1/2013 |
| KR | 2018-0037059 | 4/2018 |
| WO | 2010024923 A1 | 3/2010 |
| WO | 2013132515 A2 | 9/2013 |

OTHER PUBLICATIONS

International Preliminary Report on Patentability for Application No. PCT/US2021/042436 mailed on Feb. 23, 2023, 9 pages.
International Search Report and Written Opinion for Application No. PCT/US2021/042436 mailed on Dec. 17, 2021, 12 pages.
Chinese Patent Application No. 2024121101743120, Chinese Intellectual Property Office, Notice of Registration, 4 pages, dated Dec. 12, 2024.

* cited by examiner

VERSATILE POINT-OF-SALE SYSTEMS AND METHODS

CROSS REFERENCE TO RELATED APPLICATION

This application is a continuation of U.S. patent application Ser. No. 16/990,538, filed Aug. 11, 2020, the disclosure of which is incorporated herein in its entirety.

TECHNICAL FIELD

The present disclosure relates to point-of-sale systems and methods and more particularly to mobile point-of-sale systems according to various embodiments.

BACKGROUND

Point-of-sale (POS) systems traditionally have been fixed terminals, such as a cash register or a computer terminal executing merchant-specific applications for processing transactions. These traditional terminals are useful for placing on or behind a counter and conducting transactions at the counter. However, when a merchant wants or needs to conduct a transaction away from the counter, they are unable to move the fixed terminal, and may have to rely on other ways of conducting the transaction such as requesting that the customer come to the counter. Traditional fixed terminals are typically fixed in the software sense as well as the applications used on the terminals are typically developed, owned, and controlled by the terminal manufacturer or distributor that may only provide general software. As such, traditional terminals are not easily modified or adaptable to meet the evolving needs of the merchant. Therefore, there exists a need in the art for an improved POS system and related methods to allow for greater versatility in transaction processing.

Figure 1A:
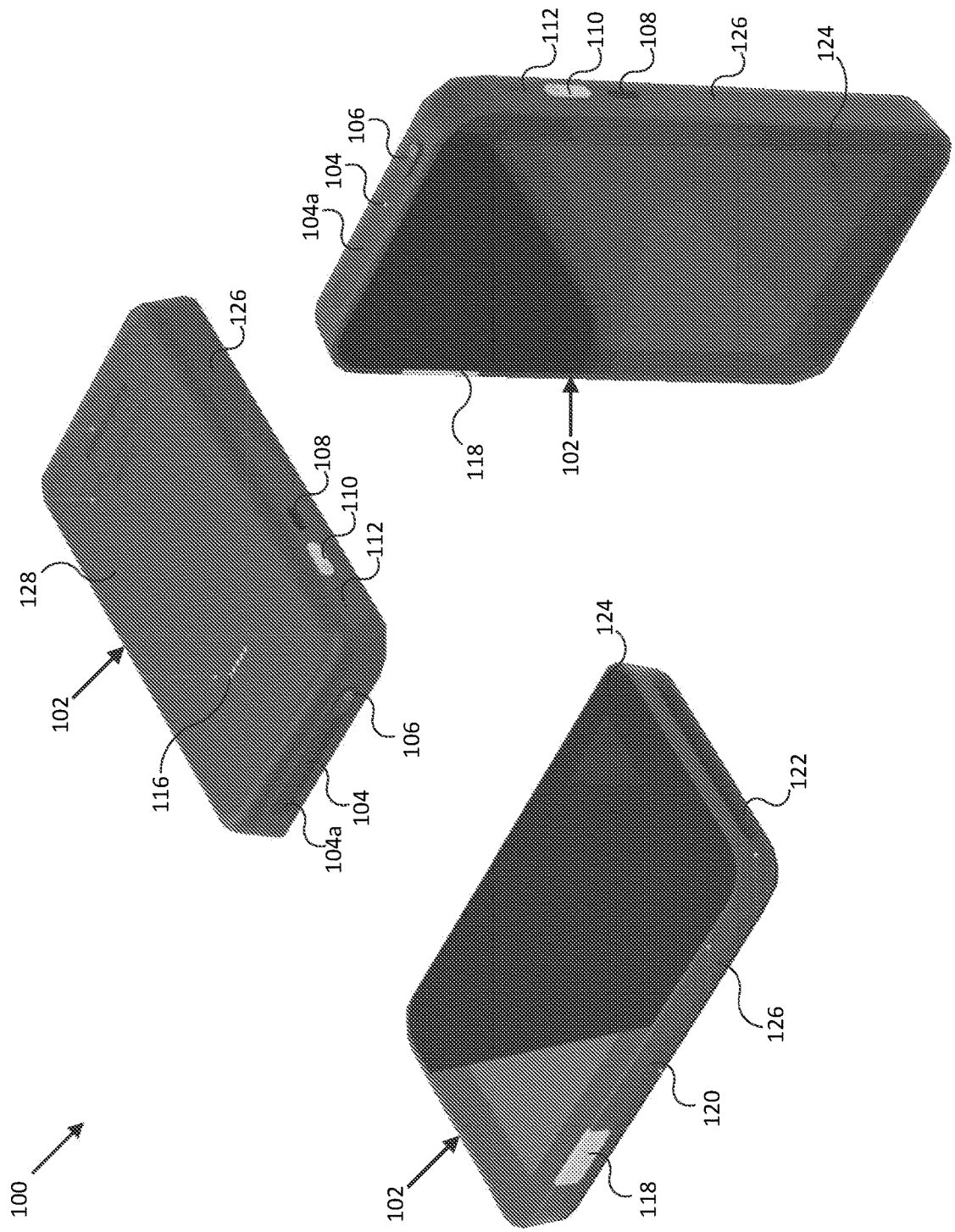
FIGS. 1A and 1B illustrate various views of a computing device of a point-of-sale system in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

The present disclosure describes systems and methods related to point-of-sale devices. In an embodiment, a point-of-sale system includes a base stand having a receiving interface that includes first electrical contacts. The POS system may further include a computing device having a user interface and a docking interface, where the docking interface has second electrical contacts and the docking interface is configured to removably dock the computing device to the receiving interface of the base stand such that the first electrical contacts of the computing device are in contact with the second electrical contacts of the base stand. The computing device may further include a card reader configured to receive and read a card when inserted into the card reader and a Near-Field Communication (NFC) component configured to transmit and receive wireless communications to and from the computing device and/or a mobile device associated with a user. The computing device may further include a scanner configured to scan machine-readable codes.

In various embodiments, the computing device may be configured to extend or enable various functions of the base stand when the computing device is docked to the base stand. For example, the computing device may enable an NFC payment acceptance function of the base stand when the computing device is docked in the base stand. In further examples, the computing device may enable a printing or battery charging function of the base stand when the computing device is docked to the base stand.

In some embodiments, user authentication for the computing device may be based on whether the computing device is docked or undocked. In further embodiments, the user authentication for the computing device may be based on a distance that the computing device is away from the base stand. For example, as the computing device moves further away from the base stand, the more stringent user authentication may become.

In some embodiments, a merchant may use a plurality of the point-of-sale devices and systems discussed herein. In some embodiments, to increase computer security associated with using the point-of-sale systems, base stands of the point-of-sale systems may be restricted to allowing certain computing devices of the point-of-sale system to be docked into the base stand and communicatively paired with the base stand. By restricting which computing device can dock/pair with base stands, hacking or misuse of point-ofsale systems may be reduced or prevented. To illustrate, restricting which computing devices can dock to a base stand may prevent a user from obtaining a third-party computing device and docking the third-party computing device to the base stand to execute fraudulent transactions. Additional advantages of the subject technology will be further apparent in view of the description below.

Referring now to FIG. 1A, illustrated are various views 100 of a computing device 102 in accordance with embodiments of the present disclosure. The computing device 102 includes a barcode scanner 104, an activation button 106, a port 108, a scan button 110, speaker outlets 112, electrical contacts 116, tab 118, subscriber identity module (SIM) card reader 120, card reader 122, display screen 124, and body frame 126.

In some embodiments, the barcode scanner 104 may be an optical scanner that can read printed, screen-displayed, or light projected barcodes. For example, the optical scanner may include a light source, a lens, and a light sensor to translate optical impulses into electrical signals. The barcode scanner 104 may include decoder circuitry capable of analyzing a barcode's image data provided by the optical scanner and decoding the data contained in the barcode. The decoder may send the decoded data to a processor of the computing device 102 for further processing. In various embodiments, the barcode scanner 104 may be implemented as a pen-type reader, laser scanner, LED scanner, camera-based reader, video camera reader, large field-of-view reader, and/or omnidirectional barcode scanner. The barcode scanner 104 may be configured to read several different types of barcodes such as Code 39, Code 128, Interleaved 2 of 5, Universal Product Codes (UPC), International Article Number (EAN), PDF417, Data Matrix, and/or Quick Response (QR) codes. In one embodiment, a window 104a (e.g., a transparent or tinted glass or plastic) of the barcode scanner 104 may be embedded in the body frame 126 opposite of the card reader 122 such that the window 104a sits flush with the body frame 126. In some embodiments, the window 104a may protrude from the body frame 126 to provide a wider field-of-view for the barcode scanner 104

According to various embodiments, the activation button 106 may be used for several functions for the computing device 102. For example, the activation button 106 may turn the computing device 102 on and off, restart the computing device 102, place the computing device 102 in a sleep-mode, and/or turn the display screen 124 on and off. As shown in FIG. 1A, the activation button 106 may be defined in the body frame 126 adjacent to the barcode scanner 104 and opposite to the card reader 122.

In various embodiments, the port 108 may be implemented as a USB Type-C, HDMI 2.0, Display Port, Thunderbolt, or Lightning port. As shown in FIG. 1A, the port 108 may be defined in the body frame 126 adjacent to scan button 110 and speaker outlets 112 according to one embodiment. The scan button 110 may serve several functions for the computing device 102. For example, the scan button 110 may activate a scan/read operation of the barcode scanner 104 and/or active a scan/read operation of the card reader 122 of the computing device 102 when a card (e.g., credit card, debit card, account card) is inserted into the card reader 122. Speaker outlets 112 may allow a speaker of the computing device 102 to output audio into a surrounding environment for a user to hear or sense outputs in accordance with an embodiment. For example, audio outputted by the speaker may correspond to alerts, instructions, and/or notifications for a user operating the computing device 102. For example, the speaker may output an audible alert when the computing device 102 has successfully docked into a base stand, received a message from the base stand, and/or is beyond a threshold distance from the base stand.

In some embodiments, the electrical contacts 116 may be disposed on a rear side of the computing device 102 opposite to the display screen 124. The electrical contacts 116 and the rear side may be part of a docking interface 128 for the computing device 102 to be removably docked to a receiving interface of a base stand such that the electrical contacts 116 of the computing device 102 are in contact with electrical contacts of the base stand as further discussed below in reference to FIG. 4A. The electrical contacts 116 may be connected to a battery assembly of the computing device 102 to allow for a battery of the computing device 102 to charge when the computing device 102 is docked in the base stand.

In one embodiment, the tab 118 may have a logo placed thereon (stamped, molded, embedded, stickered, etc.). The tab 118 may be embedded in the body frame 126 such that it is partially on a side of the body frame 126 and a front face of the computing device 102 where the display screen 124 is located. For example, a side of the tab 118 may be visible when viewing the display screen 124 from a front of the computing device 102 while another side of the tab 118 may be visible when viewing the computing device 102 from a side view. In some embodiments, the tab 118 may serve as an auxiliary button capable of being mapped to several functions. For example, the tab 118 may activate one or more functions of the activation button 106 or scan button 110 discussed above.

According to various embodiments, the SIM card reader 120 may include a SIM card tray configured to receive SIM cards such as Standard, Micro, or Nano SIM cards. The SIM card tray may slide into a SIM card reader slot defined in the body frame 126 to securely lock a SIM card in the computing device 102. With a SIM card inserted into the computing device 102, the computing device 102 may have its own international mobile subscriber identity (IMSI) number and access to a mobile phone network.

In an embodiment, the card reader 122 may allow for a user to insert a physical card such as a credit card, debit card, chip card (e.g., EMV), magstripe card, or other type of card into the computing device 102 to be read. The display screen 124 may include a touchscreen user interface capable of user input and visual output for a user to operate the computing device 102, for example, as discussed herein. In some embodiments, the touchscreen may be layered on top of an electronic visual display of an information processing system that the user can control through simple or multi-touch gestures to the touchscreen.

Figure 1B:
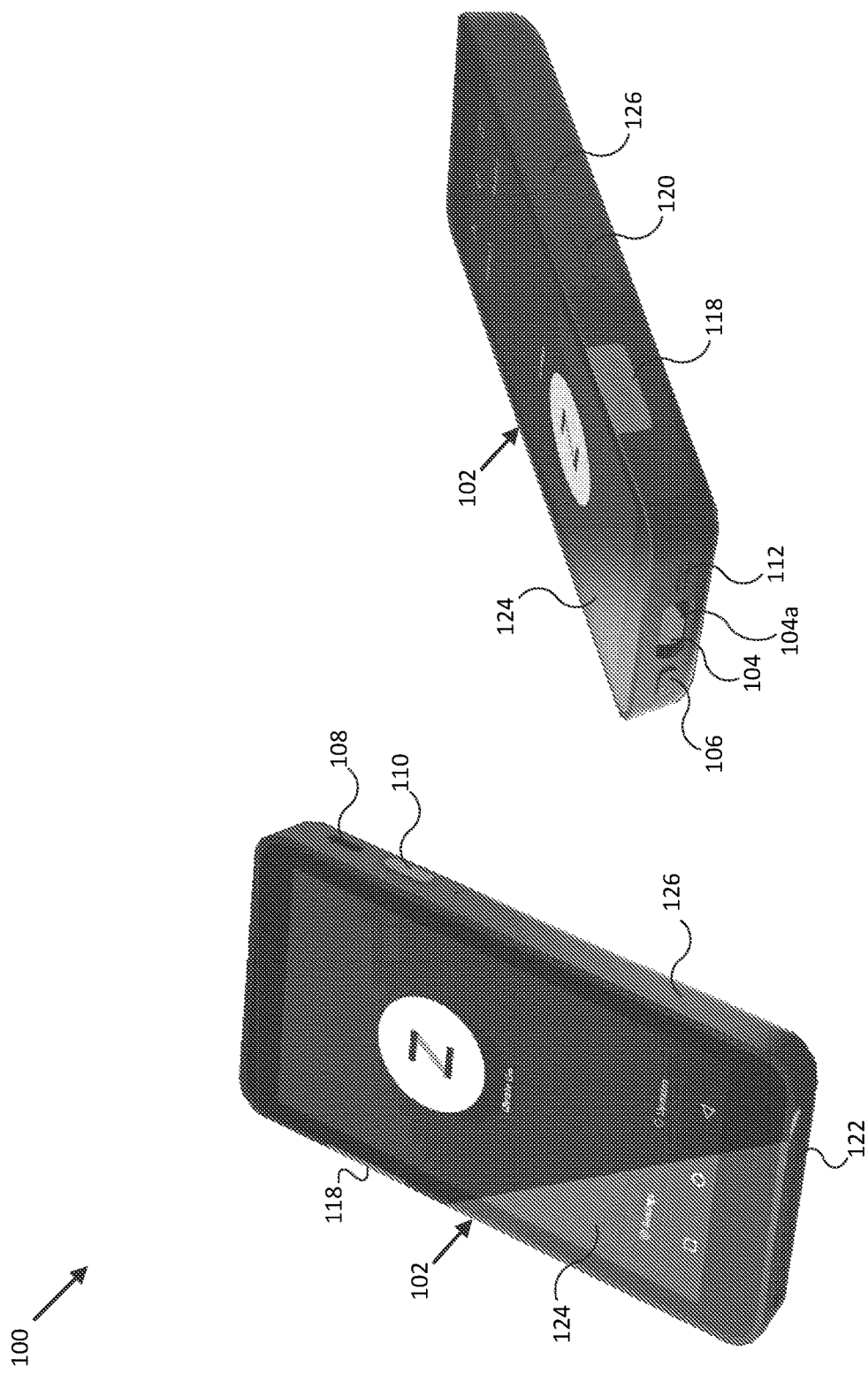

FIG. 1B illustrates various views 100 of a computing device 102 in accordance with embodiments of the present disclosure. As shown in FIG. 1B, the window 104a may be relatively smaller than that shown in FIG. 1A and may not encompass activation button 106. In the embodiment shown in FIG. 1B, the speaker outlets 112 may be disposed on the computing device 102 adjacent to the window 104a of the barcode scanner 104. Thus, audio output may be projected toward a user standing opposite from a user holding the computing device 102 in some use cases.

Figure 2:
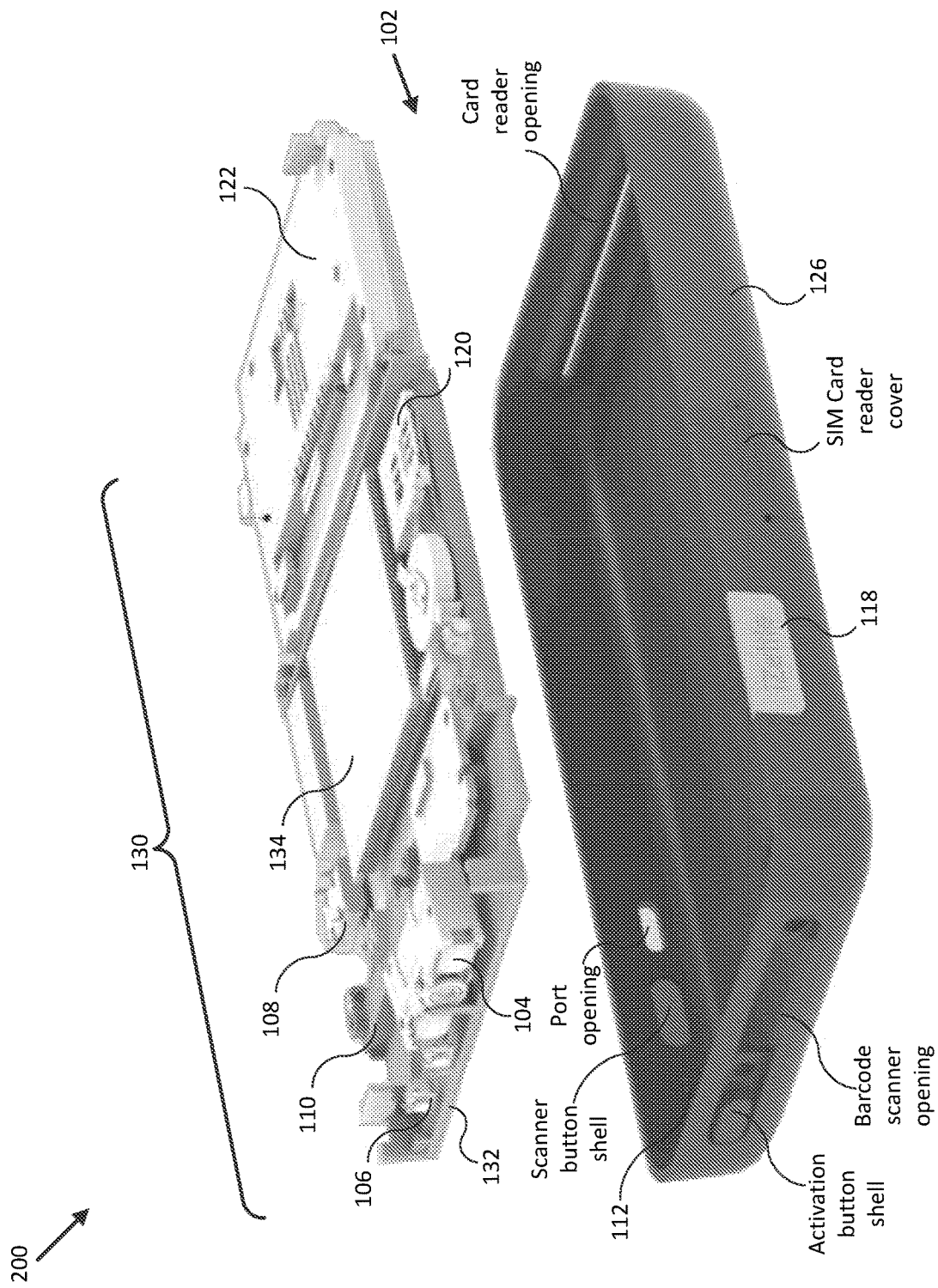
FIG. 2 illustrates an exploded view of a computing device of a point-of-sale system in accordance with one or more embodiments of the present disclosure.

FIG. 2 illustrates an exploded view 200 of a computing device 102 in accordance with one or more embodiments of the present disclosure. As shown in FIG. 2, the computing device includes internal electronic circuitry 130 mounted or otherwise coupled to a printed circuit board (PCB) 132, which may be placed inside the body frame 126 of the computing device 102 such that the components of the electronic circuitry 130 align with openings/slots/buttons on the body frame 126 corresponding to the components. Electronic circuitry 130 may include circuitry for the port 108, the scan button 110, the activation button 106, the barcode scanner 104, the SIM card reader 120, the card reader 122, a central processing unit (CPU) 134, a power supply, a WiFi module, 3G module, 4G module 5G module, LTE module, Bluetooth module, sensors (e.g., accelerometer, gyroscope, tempering), GPS module, battery, speaker, microphone, and/or a near-field communications (NFC) module. The electronic circuitry 130 may also include a built-in wireless router or access point for creating a wireless hotspot such that a base stand and/or other wireless-capable devices can wirelessly connect to the wireless router. The electronic circuitry 130 may also include a Bluetooth low energy (BLE) beacon for providing a low energy wireless connection to a base stand or other BLE-enabled devices. In some embodiments, the BLE beacon may be used to automatically check customers in and/or process payments.

Figure 3:
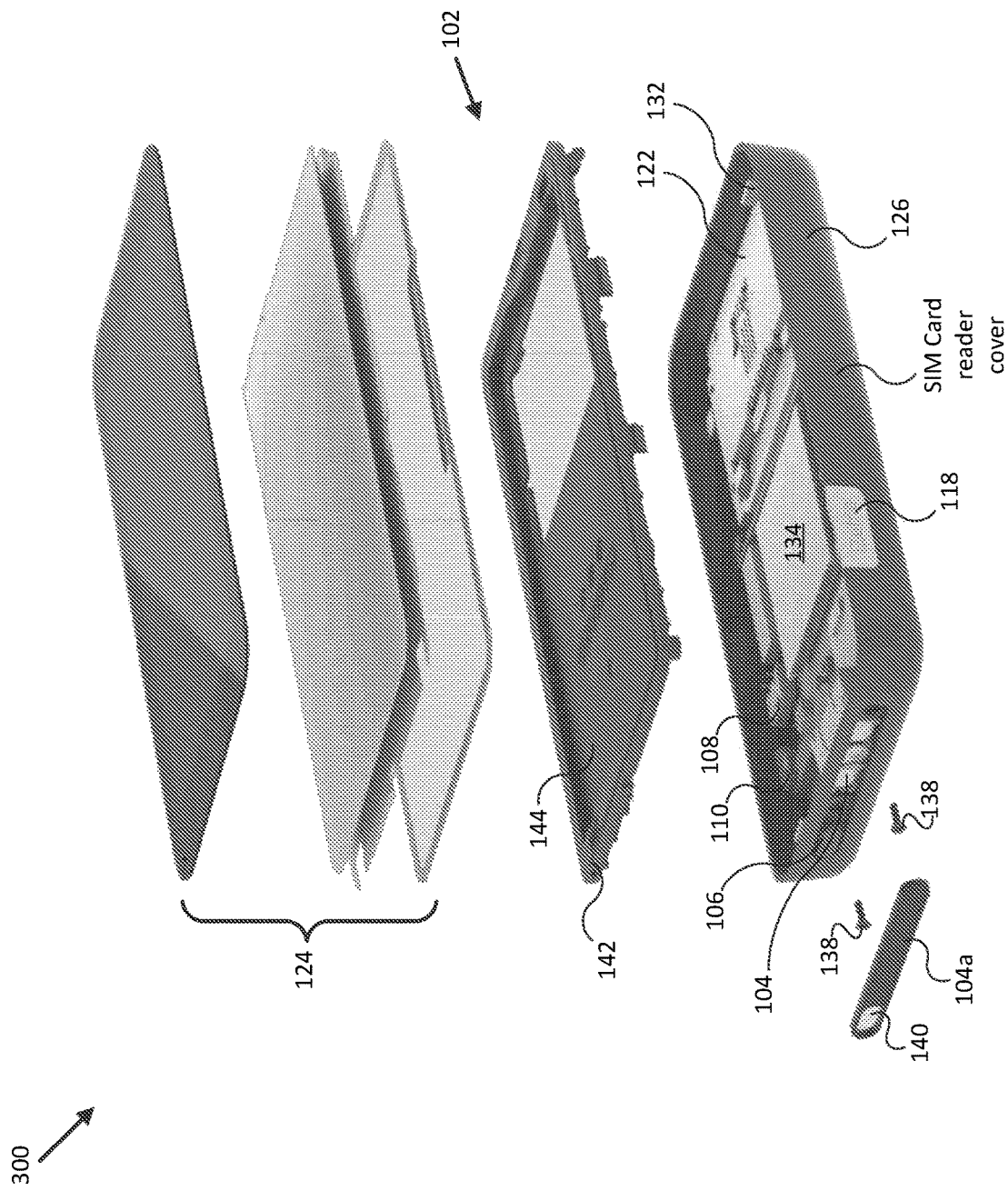
FIG. 3 illustrates an exploded view of a computing device of a point-of-sale system in accordance with one or more embodiments of the present disclosure.

FIG. 3 illustrates an exploded view 300 of a computing device 102 in accordance with one or more embodiments of the present disclosure. The window 104a may have an opening 140 that contours around activation button 106 when the window 104a is placed into the body frame 126 over the barcode scanner 104. Fasteners 138 may fasten the PCB 132 to the body frame 126 and may be hidden on an interior side to the window 104a such that they are unseen when the window 104a is placed into the body frame 126. In some embodiments, the window 104a may have a mating surface on an interior side that snaps or attaches to the fasteners 138 to hold the window 104a in place. A midframe 142 may be fastened into place in the body frame 126. In some embodiments, the midframe 142 may be made of plastic so as to be "snapped" into place in the body frame 126. The midframe 142 may have a receiving interface 144 to receive the display screen 124. In some cases, the display screen 124 may be glued into the midframe 142. The display screen 124 may be a capacitive touch screen or resistive touch screen according to some implementations.

Figure 4A:
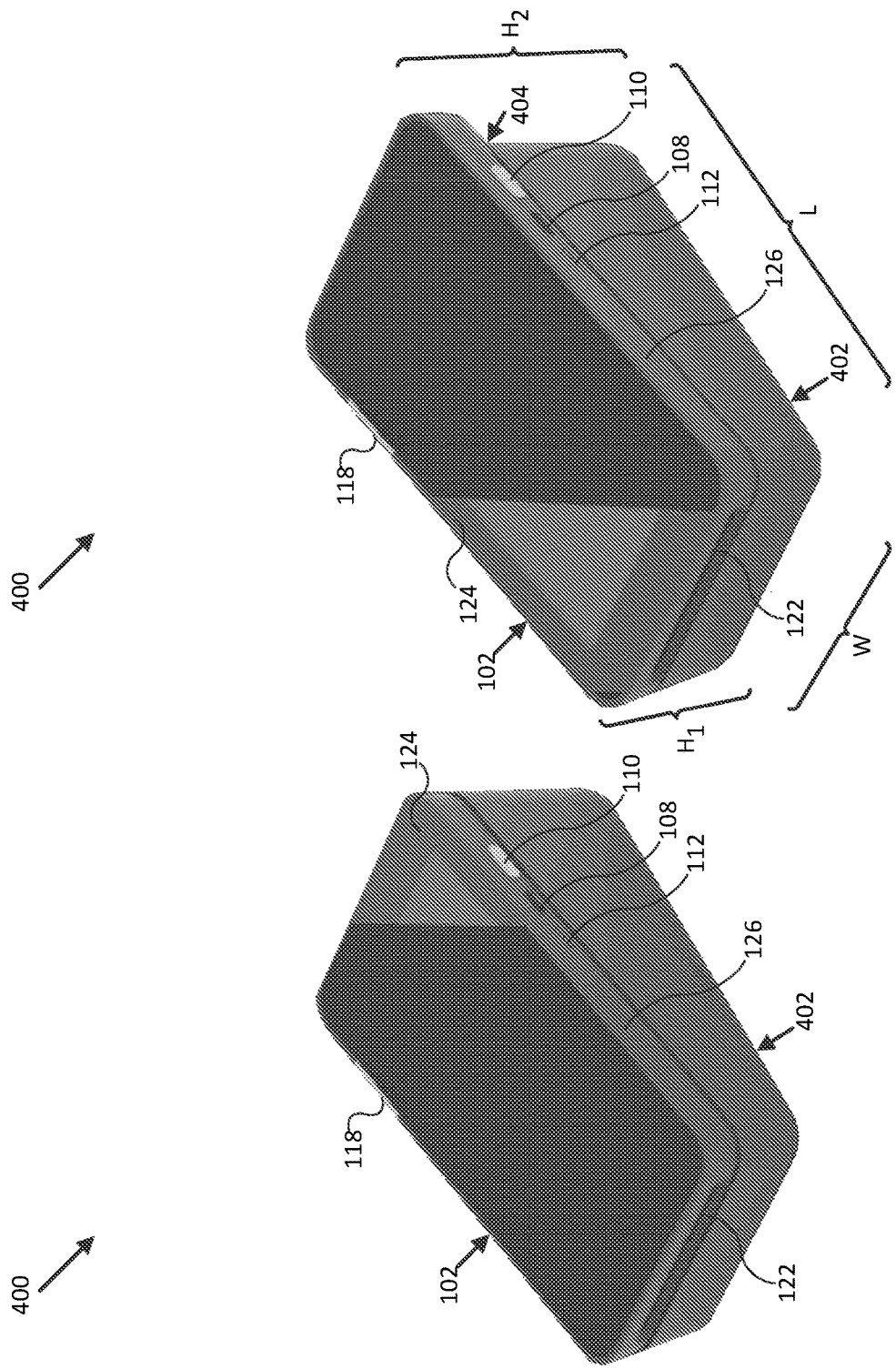
FIGS. 4A and 4B illustrate embodiments of a point-of-sale system.

FIG. 4A illustrates diagrams of a point-of-sale system 400 in accordance with one or more embodiments of the present disclosure. The point-of-sale system 400 includes the computing device 102 and a base stand 402. According to various embodiments, the computing device 102 may be used to process transactions while docked in the base stand 402 or undocked from the base stand 402 such as when a user removes the computing device 102 from the base stand 402 for remote/mobile use. The dimensions of the point-of-sale system 400 may be scaled as needed to suit a desired application taking into consideration any physical constraints such as available space. In one embodiment, the point-of-sale system 400 may have dimensions of approximately 80 mm, 140 mm, 60 mm, 45 mm which correspond to W, L, $H_2$, and $H_1$ depicted in FIG. 4A. It will be appreciated that the computing device 102 may be sufficiently small to allow for a user to place it in their pocket when they are using the computing device 102 remote from the base stand 402. In various embodiments, the base stand 402 may have electrical contacts that interface with electrical contacts 116 of the computing device 102. The base stand 402 may have a printer (e.g., to print receipts, invoices, transaction order details, etc.) and a battery charger capable of charging the computing device's 102 battery when the computing device 102 is docked in the base stand. The base stand 402 may also include a wireless beacon (e.g., Bluetooth low energy (BLE)) for providing a low energy wireless connection to the computing device 102 and/or other BLE-enabled devices. In some embodiments, the wireless beacon of the base stand 402 may be used to automatically check customers in and/or process payments as further discussed in the present disclosure below. The base stand 402 may further include an NFC module/card or radio frequency identification RFID module/card configured to receive contactless payments from contactless payments cards or mobile devices. In one embodiment, as shown in FIG. 4A, the base stand 402 may have a receiving interface that creates an overhang 404 of the computing device 102 when the computing device 102 is docked in the base stand 402 and extends beyond the bounds of the receiving interface. The overhang 404 may provide a convenient place to grasp the computing device 102 when undocking or docking the computing device 102 from the base stand 402.

In one embodiment, the base stand 402 may include a swivel configures to rotate to place the computing device 102 in a horizontal or vertical orientation and place the computing device 102 in a customer-facing or operator-facing orientation.

In some embodiments, as further described below, functions of the base stand 402 may be activated and deactivated depending on whether the computing device 402 is docked into the base stand 402 or undocked from the base stand.

Figure 4B:
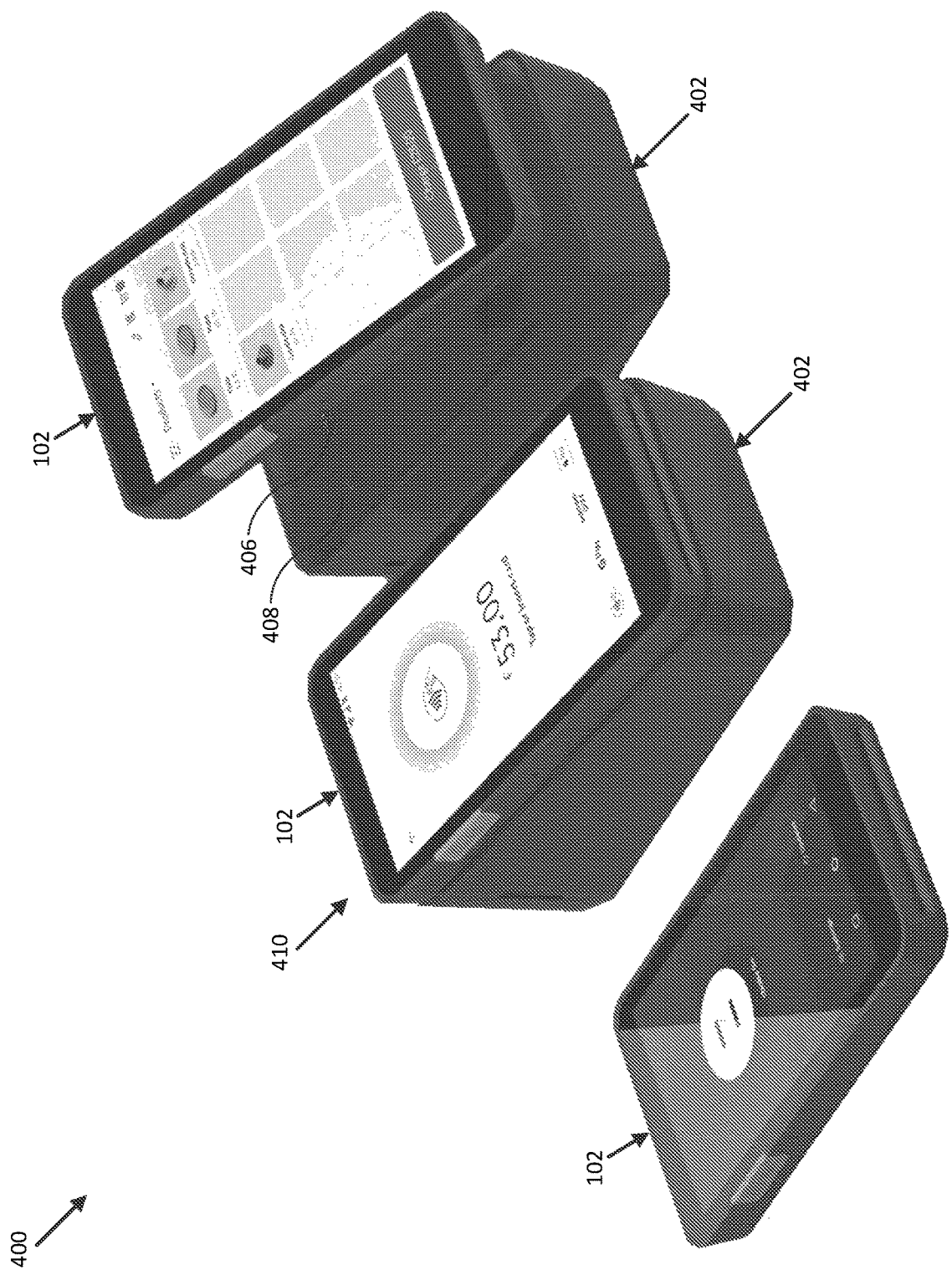

FIG. 4B illustrates diagrams of a point-of-sale system 400 in accordance with one or more embodiments of the present disclosure. The point-of-sale system 400 includes the computing device 102 and the base stand 402. As shown in FIG. 4B, the base stand 402 may have electrical contacts 406 disposed in a receiving interface 408 (e.g., mating interface) of the base stand 402. The electrical contacts 406 may interface with electrical contacts 116 of the computing device 102 when the computing device 102 is docked 410 into the base stand 402.

Figure 5A:
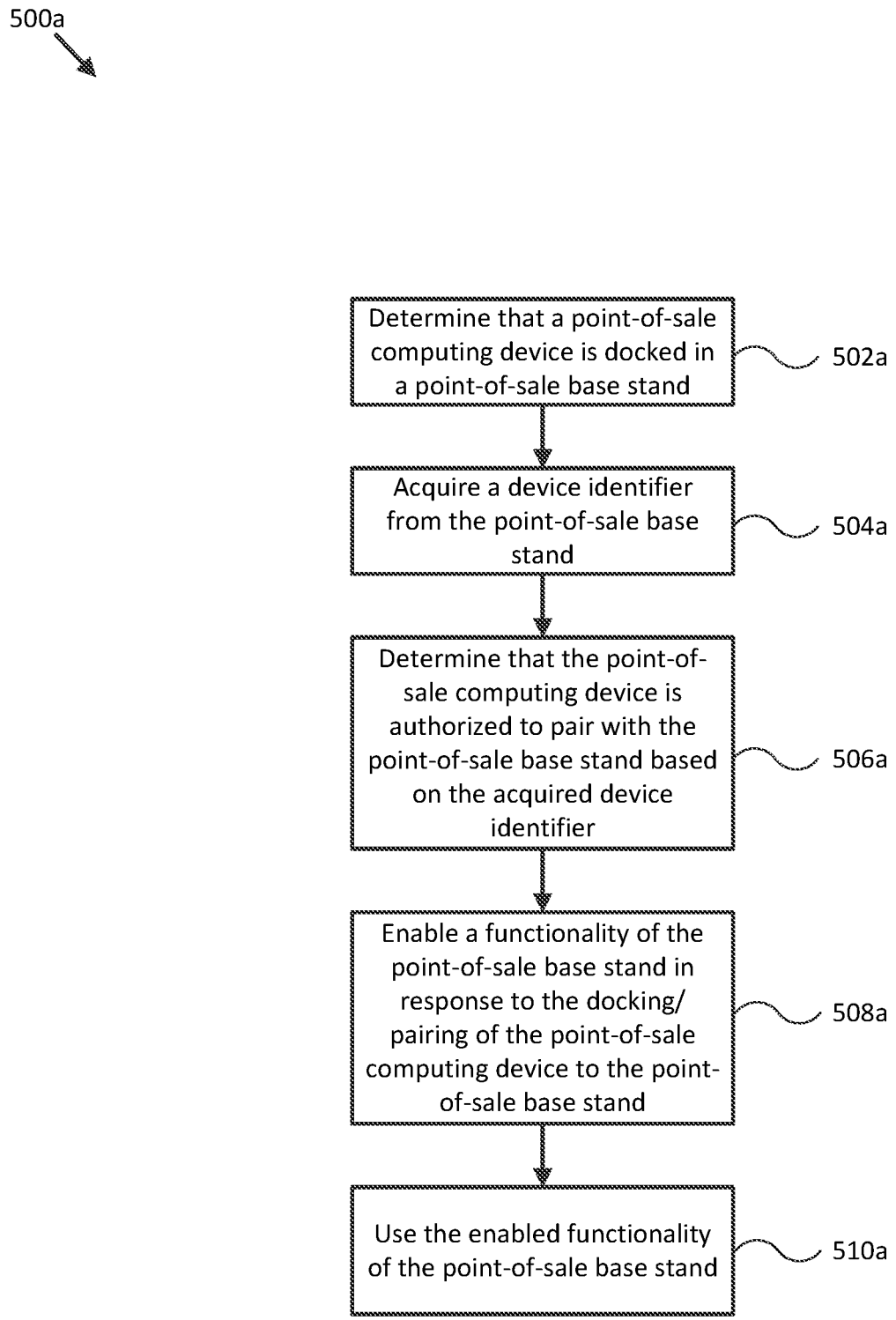
FIGS. 5A-5E illustrate flow diagrams of processes for using point-of-sale systems in accordance with one or more embodiments of the present disclosure.

FIG. 5A illustrates a flow diagram of a process 500a for using the point-of-sale system 400 in accordance with one or more embodiments of the present disclosure. For explanatory purposes, the process 500a is primarily described herein with reference to FIGS. 1-4; however, the process 500a is not limited to FIGS. 1-4. The blocks of the process 500a are described herein as occurring in serial, or linearly (e.g., one after another). However, multiple blocks of the process 500a may occur in parallel. In addition, the blocks of the process 500a need not be performed in the order shown and/or one or more of the blocks of the process 500a need not be performed.

In various embodiments, a user may have been using the computing device 102 undocked from the base stand 402 to process payments remote from the base stand 402. For example, a user may have been using the computing device 102 in a mobile fashion to assist customers at a physical location (e.g., restaurant, store, theme park, entertainment center/event, etc.). The customers may be able to pay anywhere at the physical location rather than standing in queue at a counter in some embodiments. At block 502a, the computing device 102 of the point-of-sale system 400 may be docked to the base stand 402 of the point-of-sale system 400. The base stand 402 may be located at a checkout counter, charging station where other base stands 402 are located, or at any other suitable location for a user to dock the computing device 102. Once the computing device 102 is docked, a logic device (e.g., hardware processor), operating system, and/or program application of the computing device 102 may determine that the computing device 102 is docked. For example, the computing device 102 may determine that it has been docked by detecting that electrical contacts 116 of the computing device 102 are in electrical contact with electrical contacts of the base stand 402. The computing device 102 may also determine that it has been docked by detecting that an electrical signal (e.g., voltage, current) can be drawn from the base stand 402 via the electrical contacts 116 in electrical contact with the electrical contacts of the base stand 402. In response to determining that the computing device 102 is docked, the computing device 102 (e.g., a logic device, hardware processor, operating system, program application, and/or any other hardware or software component computing device 102 discussed herein) may perform one or more operations as discussed below.

At block 504a, the computing device 102 may acquire a device identifier of the base stand 402 (e.g., via the electrical contacts 116, Bluetooth, RFID and/or NFC, WiFi) for pairing purposes (e.g., establishing a connection for additional data transfer to take place). In one embodiment, the computing device 102 may acquire the device identifier through a handshake process. The computing device 102 may compare the acquired device identifier from the base stand 402 against device identifier(s) to which the computing device 102 is authorized to dock/pair. The computing device 102 may determine that the device identifier matches a device identifier to which the computing device 102 is authorized to pair, and consequently, the computing device 102 determines that it is authorized to pair with the base stand 402 at block 506a. By pairing with the base stand 402, the computing device 102 may establish a connection with the base stand 402. Through the established connection, the computing device 102 and base stand 402 may share/transfer data in accordance with the embodiments disclosed herein.

In some embodiments, where the computing device 102 does not recognize the device identifier of the base stand 402 at block 506a, a user may have an option through the application and/or user interface of the computing device 102 to authorize the computing device 102 to learn/store the base stand's 402 device identifier for future pairing/docking (e.g., trusting the base stand 402 for future pairing/docking). For example, the user may authorize the computing device 102 to learn the new device identifier of the base stand 402 by first authenticating himself/herself through user authentication (e.g., password, PIN, biometric password such as facial recognition, finger scan, etc.) then authorizing the computing device 102 to learn the new device identifier.

In other embodiments, the base stand 402 may acquire a device identifier of the computing device 102 (e.g., via the electrical contacts 116, Bluetooth, RFID and/or NFC, WiFi) for pairing purposes (e.g., establishing a connection for additional data transfer to take place). In one embodiment, the base stand 402 may acquire the device identifier through a handshake process. The base stand 402 may compare the acquired device identifier from the computing device 102 against device identifier(s) to which the base stand 402 is authorized to dock/pair. The base stand 402 may determine that the device identifier matches a device identifier to which the base stand 402 is authorized to pair, and consequently, the base stand 402 determines that it is authorized to pair with the computing device at block 506a. By pairing with the computing device 102, the base stand 402 may establish a connection with the computing device 102. Through the established connection, the computing device 102 and base stand 402 may share/transfer data in accordance with the embodiments disclosed herein. In some embodiments, where the base stand 402 does not recognize the device identifier of the computing device 102, a user may have an option through the application and/or user interface of the computing device 102 to authorize the base stand 402 to learn/store the computing device's 402 device identifier for future pairing/docking (e.g., trusting the computing device 102 for future pairing/docking). For example, the user may authorize the base stand 402 to learn the new device identifier of the computing device 102 by first authenticating himself/herself through user authentication corresponding to the base stand 402 (e.g., password, PIN, biometric password such as facial recognition, finger scan, and/or other authentication inputs.) then authorizing the base stand 402 to learn the new device identifier. The computing device 102 may transmit (e.g., by physical electrical connection or wirelessly) any authentication input entered in the user interface to the base stand 402 for user authentication by the base stand. In this regard, the base stand 402 may have access to a database and authentication protocol to determine whether the authentication input matches an authentication profile associated with the base stand 402. If the authentication input matches an authentication profile, the user may be authenticated and allowed to proceed with authorizing the base stand 402 to learn/store the device identifier of the computing device 102 for future pairing.

At block 508a, the computing device 102 may enable a functionality of the base stand 402, for use at block 510a, in response to determining that the computing device 102 has been authorized to dock/pair to the base stand 402. For example, the base stand 402 may include an NFC component configured to transmit and receive wireless communications to and from the computing device 102 and mobile devices associated with users (e.g., customers). The NFC component and its capability of accepting NFC payments may be enabled when the computing device 102 is docked/paired with the base stand 402 and there is proper authorization for the docking/pairing. In some embodiments, the NFC component and related functions of the base stand 402 may be disabled/inactive while the computing device 102 was undocked from the base stand 402. In various embodiments, the NFC component may be configured to accept Apple Pay™, Google Pay™, Samsung Pay™, and other NFC tap payments.

As an illustration, a user may have been using the computing device 102 remotely from the base stand 402. The user may bring the computing device 102 to the base stand 402 and dock the computing device 102 in the base stand 402. By docking the computing device 102 in the base stand 402, an NFC component of the base stand 402 may be enabled so that the base stand 402 can receive NFC payments. For example, this may be useful where an NFC component of the computing device 102 is difficult to reach for a customer but the NFC component of the base stand 402 is conveniently located on a customer-facing side of the base stand 402 so that the customer can easily perform an NFC tap (or RFID tap) with their contactless card or mobile phone to the base stand 402 and execute an NFC payment.

In one embodiment, in response to determining that the computing device 102 has been docked to the base stand 402, the computing device 102 may enable a functionality of the base stand 402 of establishing a wireless connection with the computing device 102. For example, the base stand 402 may have stored in its memory a device identifier or a plurality of device identifiers corresponding to computing device(s) 102 to which the base stand 402 is authorized to pair or couple (e.g., establish a wireless data transfer beyond pairing). For example, the base stand 402 may have been authorized to pair with certain computing devices 102 through its device settings established in activation/registration/setup of the base stand 402 or may have been authorized by default to pair with certain device identifier(s) of computing devices 102. Once the computing device 102 has been docked/paired as discussed above, the wireless connection functionality may be enabled so that the computing device 102 can be undocked and used remotely while maintaining a wireless connection with the base stand 402. Thus, the computing device 102 and the base stand 402 may be able to share any data or instructions. For example, data/instructions for wireless printing may be communicated between the computing device 102 and base stand 402. As another example, data/instructions check-in statuses discussed below in reference to FIG. 5B may be communicated between the computing device 102 and the base stand 402.

In an embodiment, in response to determining that the computing device 102 has been docked to the base stand 402, the computing device 102 may enable a printing functionality of the base stand 402. For example, the base stand 402 may include a printer that is activated/enabled when the computing device 102 is docked and paired with the base stand 402. Once the printer has been enabled/activated, the printer may be controlled through a user interface of the computing device 102. In some cases, the printer may print receipts, invoices, transaction order details, and so forth. The printer may be a dot matrix printer, thermal printer, and/or ink jet printer in various implementations. In some embodiments, the base stand 402 may verify that it is authorized to pair with the computing device 102 as discussed above before printer functionality of the base stand 402 is enabled. If the base stand 402 is not authorized to pair with a computing device 102 that has been docked in the base stand 402, the printer functionality may remain inactive or be disabled until proper authorization has occurred. In such cases, the computing device 102 may display a notification on its display screen 124 or user interface indicating to the user that the base stand 402 does not match with the computing device 102 or is not authorized to dock or communicate/pair with the computing device 102.

In some embodiments, in response to determining that the computing device 102 has been docked to the base stand 402, the computing device 102 may enable a battery charging functionality of the base stand 402. For example, when the electrical contacts 116 of the docking interface of the computing device 102 are placed in contact with the electrical contacts of the receiving interface of the base stand 402, such as when the computing device 102 is docked to the base stand 402 as discussed above, a battery of the computing device 102 may be electrically coupled to a battery charger of the base stand 402 and the battery can be charged. In some embodiments, the base stand 402 may verify that it is authorized to pair with the computing device 102 as discussed above, or vice versa, before battery charging functionality of the base stand 402 is enabled. If the base stand 402 is not authorized to pair with a computing device 102 that has been docked in the base stand 402, the battery charging functionality may remain inactive or be disabled. In such cases, the computing device 102 may display a notification on its display screen 124 or user interface indicating to a user that the base stand 402 does not match with the computing device 102 and the computing device's 102 battery will not be charged.

Figure 5B:
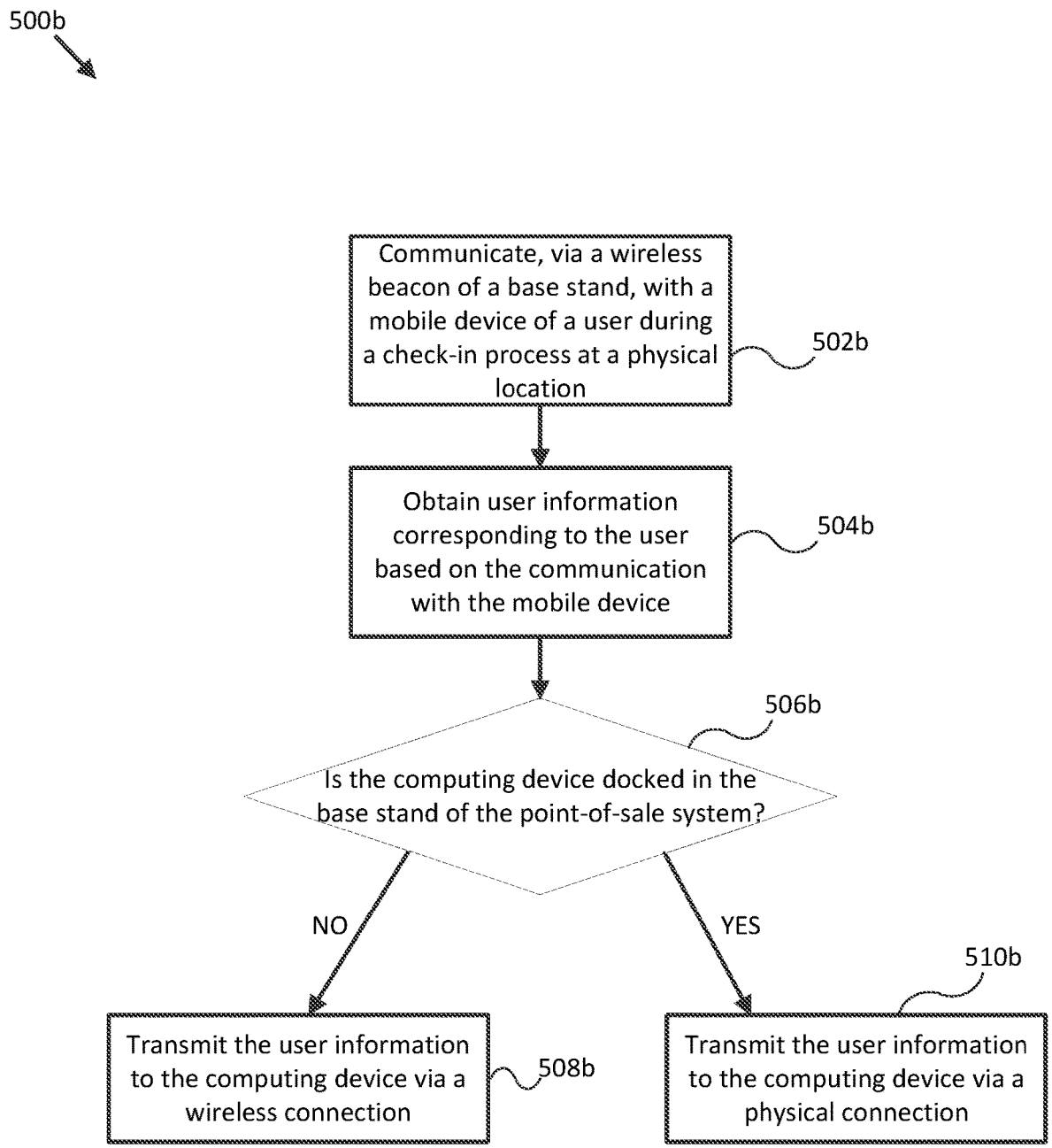

FIG. 5B illustrates a flow diagram of a process 500b for using the point-of-sale system 400 in accordance with one or more embodiments of the present disclosure. For explanatory purposes, the process 500b is primarily described herein with reference to FIGS. 1-5A; however, the process 500b is not limited to FIGS. 1-5A. The blocks of the process 500b are described herein as occurring in serial, or linearly (e.g., one after another). However, multiple blocks of the process 500b may occur in parallel. In addition, the blocks of the process 500b need not be performed in the order shown and/or one or more of the blocks of the process 500b need not be performed.

The following illustration provides an example context in which the process 500b may be implemented. A merchant physical location may have one or more of the point-of-sale systems 400 discussed herein to allow a consumer to pay for a good or service at a point of sale through the use of their mobile device. For example, a user may have an application such as a payment application installed on their mobile device in which the user can present (actively or passively, e.g., as the user walks into the physical location) through their mobile device at an appropriate time and location at the merchant physical location. The merchant associated with the physical location may check-in the user through the process 500b, after which the merchant may accept payment through contactless communication with the checked-in device of the user. For example, through the check-in the merchant may have all the necessary user information to proceed with carrying out a transaction without requiring the user to take out their mobile phone or wallet.

At block 502b, a wireless beacon (or other suitable short-range communication protocol, such as, but not limited to, Bluetooth) of the base stand 402 may communicate with a mobile device of a user during a check-in process at a physical location. For example, the wireless beacon may be a BLE enabled device that can broadcast BLE signals to mobile devices within range of the wireless beacon. A user's mobile device may be in a passive discovery mode to allow for detection of the presence of the BLE signals automatically such as when the user walks into the physical location. The passive discovery mode may allow for the mobile device to search for nearby BLE signals in a continuous, semi-continuous, or intermittent manner as a background function of the mobile device at low energy and bandwidth levels.

At block 504b, the wireless beacon of the base stand 402 may obtain user information corresponding to the user based on the communication with the mobile device of the user. For example, where the wireless beacon of the base stand 402 detects the presence of the mobile device, the wireless beacon of the base stand 402 may communicate with the mobile device to perform a handshake and exchange information such as a device identifier, user identifier, and/or account identifier. In some embodiments, the base stand 402 may receive the information obtained through its wireless beacon to determine an account associated with the mobile device. For example, the base stand 402 may have access to the Internet (wired or wirelessly) and may request a merchant server to validate that the device identifier from the mobile device matches an account registered with the merchant. The base stand 402 may receive a response from the merchant server indicating whether the identifier matches a registered account. If the identifier matches an account, the base stand 402 may further request account/user information (e.g., contact information, billing information, financial information, user preferences such as payment card preferences) associated with the account from the merchant server. The account information may include the necessary information to carry out a transaction without requiring the user to take out their mobile phone or wallet.

At block 506b, the base stand 402 may determine whether the computing device 102 is docked in the base stand 402. A logic device (e.g., hardware processor), operating system, and/or program application of the base stand 402 may determine whether the computing device 102 is docked. For example, the base stand 402 may determine that the computing device 102 has been docked by detecting that the electrical contacts 116 of the computing device 102 are in electrical contact with electrical contacts of the base stand 402. The computing device 102 may also determine that it has been docked by detecting that a close circuit is formed from the electrical contacts 116 of the computing device 102 being in electrical contact with the electrical contacts of the base stand 402.

In response to determining that the computing device 102 is docked, the base stand 402 may transmit the account information to the computing device 102 at block 510*b* via a physical connection (e.g., the computing device's 102 electrical contacts 116 coupling to the base stand's 402 electrical contacts of its receiving interface). The transmittal of the account information may cause the user to be checked-in at the physical location corresponding to the computing device 102. The transmittal of the account information may further cause the account information to be automatically populated in the user interface of the computing device 102. For example, the account information may be automatically populated in the user interface when the user is checking out such as when the user enters a PIN, account number, or other identifying information that would call the account information to auto-populate in the user interface.

In response to determining that the computing device 102 is not docked in the base stand 402, the base stand 402 may transmit the account information to the computing device 102 via a wireless connection (e.g., Bluetooth, WiFi, NFC) at block 508*b*. In various embodiments, the process 500*a* discussed above in reference to FIG. 5A may be performed to establish a connection (e.g., pairing) between the base stand 402 and the computing device 102 prior to the base stand 402 sending the account information to the computing device 102 at block 508*b*.

Figure 5C:
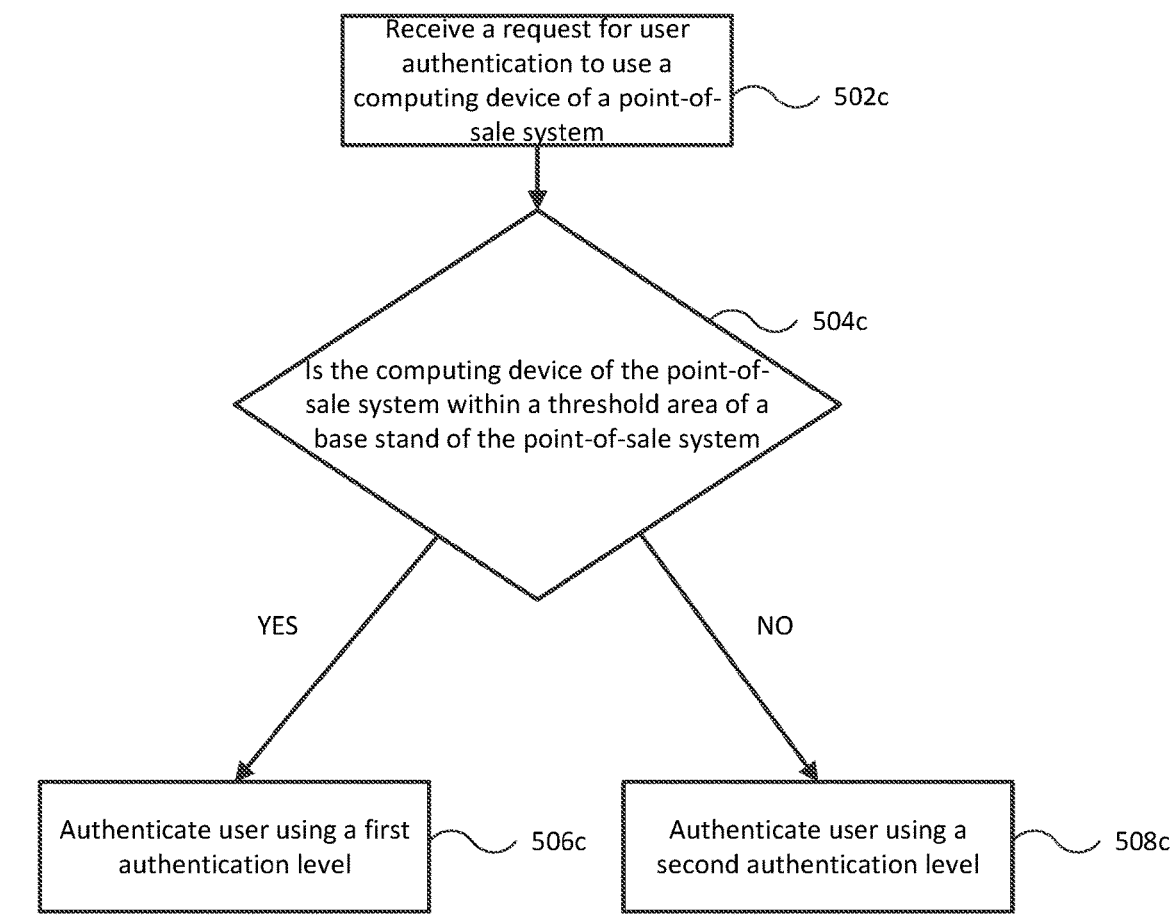

FIG. 5C illustrates a flow diagram of a process 500*c* for using the point-of-sale system 400 in accordance with one or more embodiments of the present disclosure. For explanatory purposes, the process 500*c* is primarily described herein with reference to FIGS. 1-5B; however, the process 500*c* is not limited to FIGS. 1-5B. The blocks of the process 500*c* are described herein as occurring in serial, or linearly (e.g., one after another). However, multiple blocks of the process 500*c* may occur in parallel. In addition, the blocks of the process 500*c* need not be performed in the order shown and/or one or more of the blocks of the process 500*c* need not be performed. Prior to process 500*c*, a setup process may have been completed between the computing device 102 and the base stand 402 as described in FIG. 5A (i.e., a device identifier exchange may have already taken place so that computing device 120 is authorized to pair with base stand 402).

At block 502*c*, the computing device 102 may receive a user request for user authentication to operate the computing device 102. For example, the user may want to use an application on the computing device 102, and before the application allows the user to proceed, it may require that the user authenticate herself/himself. In one case, the application may be a payment application for the user to process a transaction for a customer.

At block 504*c*, in response to receiving the user request for user authentication, the computing device 102 may determine whether the computing device 102 is within a threshold area of the base stand 402. In one embodiment, the computing device 102 may determine whether the computing device 102 is within a threshold area of the base stand 402 based on determining whether the computing device 102 and the base stand 402 are connected to the same WiFi network. If the computing device 102 and the base stand 402 are connected to the same WiFi network, they may be considered within the threshold area.

In other embodiments, the computing device 102 may determine whether the computing device 102 is within a threshold area of the base stand 402 based on determining whether the computing device 102 is connected to the base stand 402 via WiFi, NFC, or Bluetooth connection. If the computing device 102 and the base stand 402 are connected via the WiFi, NFC, or Bluetooth connection, they may be considered within the threshold area. In one or more embodiments, rather than determining whether the computing device 102 and the base stand 402 are connected via a Wifi, NFC or Bluetooth connection in order to determine if the computing device 102 is within the threshold area of base stand 402, computing device 102 may determine whether a signal strength (such as Wifi signal strength) of a connection between the computing device 102 and base stand 402 is a above a threshold signal strength, and if the signal strength is above a threshold signal strength, the computing device 102 determines that the computing device 102 is within the threshold area of the base stand 402.

In some embodiments, the computing device 102 may determine whether the computing device 102 is within a threshold area of the base stand 402 based on determining a distance between the computing device 102 and the base stand 402. In some embodiments, the computing device 102 may request a GPS location of the base stand 402 and compare a received GPS location of the base stand 402 against the computing device's 102 determined GPS location to calculate a distance between the computing device 102 and base stand 402. For example, an equirectangular approximation. haversine formula, and/or the spherical law of cosines may be used to calculate the distance between the GPS location of the computing device 102 and the base stand 402. If the computing device 102 is within a threshold distance from the base stand 402 based on the GPS location comparison, it may be determined to be within the threshold area.

At block 506*c*, if the computing device 102 is within the threshold area of the base stand 402, the computing device 102 may authenticate the user based on a first level of authentication. At block 508*c*, if the computing device 102 is not within the threshold area of the base stand 402, the computing device 102 may authenticate the user based on a second level of authentication. In some embodiments, the second level of authentication may be more stringent than the first level of authentication.

As an illustrative example, the first authentication level may prompt the user for a PIN code for user authentication. Whereas the second authentication level may prompt the user for a biometric input/password and a long text password (e.g., 16 characters) for user authentication. Various user authentication methods such as a biometric password (fingerprint, iris recognition, retina scan, facial recognition, voice recognition), alphanumeric password, PIN code, and two-factor authentication (e.g., text or call to a telephone number as part of two-factor authentication along with another user authentication input) may be used and/or combined to provide the desired computer security for the authentication levels as discussed herein.

In further embodiments, the process described in FIG. 5C may correspond to more than two authentication levels being utilized. For example, with regard to determining whether the computing device 102 is within a threshold area of the base stand 402 based on determining whether a distance between the computing device 102 and based stand 402 are within a threshold distance, there may be two threshold distances so that if the distance is determined to be within the first threshold distance a first authentication level may apply, if the distance is determined to be between the first threshold distance and the second threshold distance, a second authentication level may apply, and if the distance is determined to be beyond the second threshold distance, a third authentication level may apply.

Figure 5D:
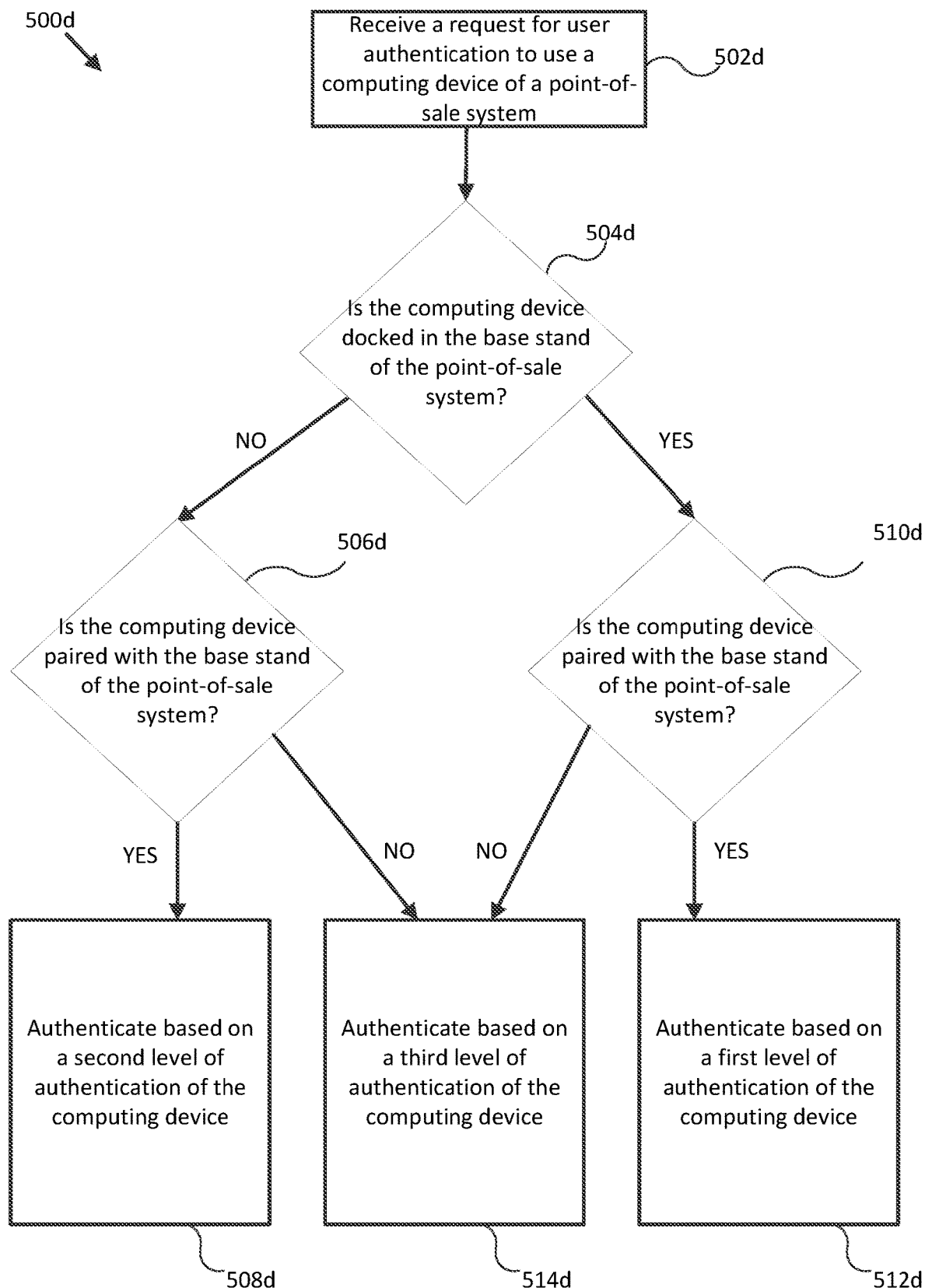

FIG. 5D illustrates a flow diagram of a process 500*d* for using the point-of-sale system 400 in accordance with one or more embodiments of the present disclosure. For explanatory purposes, the process 500*d* is primarily described herein with reference to FIGS. 1-5C; however, the process 500*d* is not limited to FIGS. 1-5C. The blocks of the process 500*d* are described herein as occurring in serial, or linearly (e.g., one after another). However, multiple blocks of the process 500*d* may occur in parallel. In addition, the blocks of the process 500*d* need not be performed in the order shown and/or one or more of the blocks of the process 500*d* need not be performed.

According to some embodiments, the computing device 102 may have a plurality of levels of user authentication. Each authentication level may require different user inputs and/or completed authentication challenges from a user to authenticate the user for operation of the computing device 102. At block 502*d*, the computing device 102 may receive a user request for user authentication to operate the computing device 102. For example, the user may want to use an application on the computing device 102, and before the application allows the user to proceed, it may require that the user authenticate herself/himself (e.g., via a user authentication prompt screen). In one case, the application may be a payment application for the user to process a transaction for a customer.

At block 504*d*, the computing device 102 may determine whether the computing device is docked in the base stand 402 or undocked from the base stand 402. For example, the computing device 102 may determine whether it is docked to or undocked from the base stand 402 in accordance with process 500*a* and 500*b* discussed herein.

At block 510*d*, in response to determining that the computing device 102 is docked to the base stand 402, the computing device 102 may determine whether it is paired with the base stand 402. At block 512*d*, in response to determining that the computing device 102 is docked to the base stand 402 and paired with the base stand 402, the computing device 102 may proceed to authenticate the user based on a first level of authentication. The first level of authentication may be a least stringent level of authentication since during a time when the computing device 102 is docked in the base stand 402 and paired to the base stand 402, it may be assumed to be more secure.

At block 506*d*, in response to determining that the computing device 102 is not docked to the base stand 402, the computing device 102 may determine whether it is paired with the base stand 402. The computing device 102 may determine whether it is paired with the base stand 402 according to process 500*a* and 500*b* discussed herein (e.g., there is a pairing between the computing device 102 and the base stand 402 through authorization and device identifier verification).

At block 508*d*, in response to determining that the computing device 102 is undocked from the base stand 402 and paired with the base stand 402, the computing device 102 may proceed to authenticate the user based on a second level of authentication. The second level of authentication may be more stringent than the first level of authentication.

At block 514*d*, the computing device 102 may authenticate the user based on a third level of authentication when the computing device 102 is not docked in the base stand 402 and not paired with the base stand 402 ("NO" at block 504*d* and 506*d*) or when the computing device 102 is docked in the base stand and not paired with the based stand 402 ("YES" at block 504*d* and "NO" at block 510*d*). In other words, where the computing device 102 is not paired with the base stand 402, the computing device 102 may use a third level of authentication for user authentication. The third level of authentication may be more stringent than the first and second levels of authentication.

In some embodiments, the computing device 102 may determine whether it is docked in the base stand 402 based on whether the electrical contacts 116 on the docking interface 128 of the computing device 102 are in contact with electrical contacts of the receiving interface of the base stand 402 as discussed herein. In various embodiments, the computing device 402 may further determine whether it is properly paired with the base stand 402 based on a successful pairing process as discussed herein. For example, the computing device 102 may determine whether it has been paired with the appropriate base stand 402 based on matching device identifiers between the computing device 102 and the base stand 402. For example, the computing device 102 may have stored in its memory a device identifier or a plurality of device identifiers corresponding to base stand(s) 402 to which the computing device 102 is authorized to pair or couple (e.g., establish a wireless or physical/wired connection for data transfer beyond pairing). The computing device 102 may have been authorized to pair with certain base stand(s) 402 through device settings established in activation/registration/setup of the computing device 102 and/or base stand(s) 402. In some cases, the computing device 102 may have been authorized by default to pair with certain device identifier(s) of base stands 402. In other cases, a user may have authorized pairing between the computing device 102 and the base stand 402 by learning the new device identifier of the base stand 402 when the computing device 102 is docked in the base stand 402.

In one example use case, less stringent authentication challenges such as shorter passwords, and/or PINs may be used for the first level of authentication. More stringent authentication such as biometric passwords (e.g., facial recognition, voice recognition, finger scanning, eye scans), longer passwords, two-factor authentication, and so forth may be used for the second level of authentication. A most stringent authentication such as a combination of biometric passwords, longer passwords, two-factor authentication, and PINs may be used for the third level of authentication.

In one embodiment, where the computing device 102 is undocked but paired to the base stand 402 (e.g., block 508*d*), the second level of authentication may progressively increase in stringency as the computing device 102 increases in distance from the base stand 402. For example, a plurality of authentication requirements may correspond to different ranges of distance that the computing device 102 is away from the base stand 402. Ranges of distances may be determined by the computing device 102 based on wireless signal strength between the computing device 102 and the base stand 402 (e.g., weaker Bluetooth, WiFi, NFC signal strength mat correlate to farther distance and stronger signal strength may correlate to short distance). For example, signal strength expressed in decibels and measured by the computing device 102 may be used by the computing device 102 to convert such to an approximate distance between the computing device 102 and the base stand 402. In some embodiments, the computing device 102 may request a GPS location of the base stand 402, or vice versa, and compare the base stand's 402 GPS location against the computing device's 102 GPS location to determine a distance between the computing device 102 and the base stand 402.

As an illustrative example, when the computing device 102 is in a short distance away (e.g., within a first predetermined distance, such as 3 feet) from the base stand 402, an authentication requiring a biometric password may be used. When the computing device 102 is in a medium distance away (e.g., outside the first predetermined distance but within a second predetermined distance farther than the first predetermined distance) from the base stand 402, an authentication requiring the biometric password and a long password (e.g., 16 characters) may be used. When the computing device 102 is in a long distance away (e.g., outside the second predetermined distance but within a third predetermined distance longer than the second predetermined distance) from the base stand 402, an authentication requiring the biometric password, long password, and two-factor authentication may be used.

In some instances, the computing device 102 may prevent the user from authenticating himself/herself after the computing device 102 exceeds a defined maximum distance away from the base stand 402 or if a wireless connection to the base stand 402 is no longer detected (e.g., a signal strength is below a threshold indicating that the computing device 102 is too far from the base stand 402). Thus, a user in possession of the computing device 102 who leaves the general vicinity of the physical location where the base stand 402 is located may be prevented from using the computing device 102 to perform transactions. However, in other instances, the computing device 102 may have defined user preferences or device settings to allow a user to perform a transaction using the computing device 102 even when a wireless connection to the base stand 402 is no longer detected. A certain level of authentication may be enabled for an instance where the computing device 102 no longer detects any wireless connection to the base stand 402.

The various predetermined distances above can be fixed (set by the merchant or service provider) or dynamic, such as based on a density of computing devices at the merchant location, where a higher density may result in the predetermined distances being shorter than a lower density of computing devices. The foregoing illustrations of required inputs for user authentication were simply examples of the various authentication challenges and any combination of user authentication inputs may be implemented to suit a desired application.

Figure 5E:
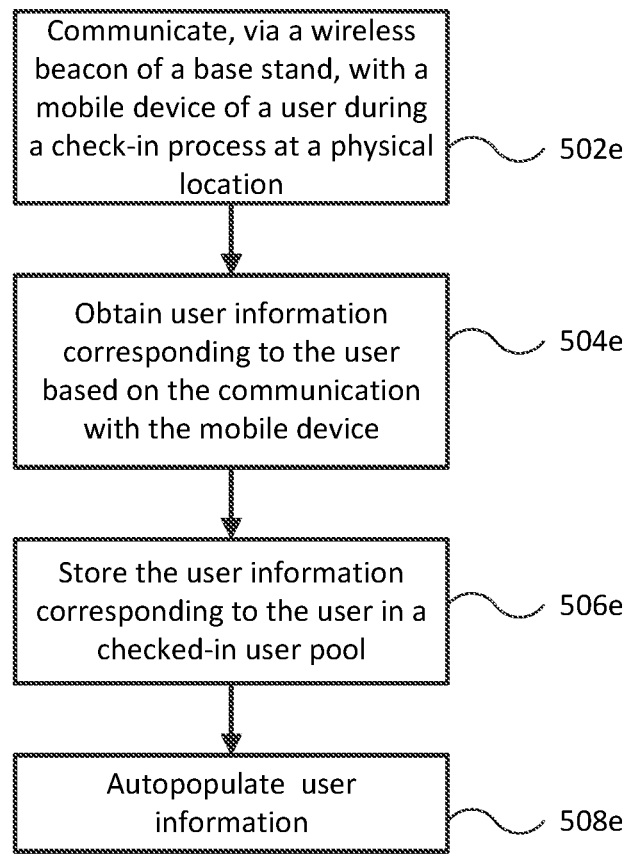

FIG. 5E illustrates a flow diagram of a process 500e for using the point-of-sale system 400 in accordance with one or more embodiments of the present disclosure. For explanatory purposes, the process 500e is primarily described herein with reference to FIGS. 1-5D; however, the process 500e is not limited to FIGS. 1-5D. The blocks of the process 500e are described herein as occurring in serial, or linearly (e.g., one after another). However, multiple blocks of the process 500e may occur in parallel. In addition, the blocks of the process 500e need not be performed in the order shown and/or one or more of the blocks of the process 500e need not be performed.

At block 502e, a wireless beacon (or other suitable short-range communication protocol, such as, but not limited to, Bluetooth) of the base stand 402 may communicate with a mobile device of a user during a check-in process at a physical location (e.g., a restaurant, retail store, etc.). For example, the wireless beacon may be a BLE enabled device that can broadcast BLE signals to mobile devices within range of the wireless beacon. A user's mobile device may be in a passive discovery mode to allow for detection of the presence of the BLE signals automatically such as when the user walks into the physical location. The passive discovery mode may allow for the mobile device to search for nearby BLE signals in a continuous, semi-continuous, or intermittent manner as a background function of the mobile device at low energy and bandwidth levels.

At block 504e, the wireless beacon of the base stand 402 may obtain user information corresponding to the user based on the communication with the mobile device of the user. For example, where the wireless beacon of the base stand 402 detects the presence of the mobile device, the wireless beacon of the base stand 402 may communicate with the mobile device to perform a handshake to establish a communicative channel and exchange information such as a device identifier, user identifier, and/or account identifier. In some embodiments, the base stand 402 may receive the information obtained through its wireless beacon and send the information to the computing device 102 such that the computing device 102 may determine a user account associated with the mobile device. For example, the computing device 102 may have access to the Internet and may request a merchant server to validate that the device identifier obtained from the mobile device matches an account registered with the merchant. The computing device 102 may receive a response from the merchant server indicating whether the identifier matches a registered account. If the identifier matches an account, the computing device 102 may further request account/user information (e.g., contact information, billing information, financial information, user preferences such as payment card preferences) associated with the account from the merchant server. The account information may include information to carry out a transaction without requiring the user to take out their mobile phone or wallet.

At block 506e, the computing device 102 may store the account information locally. For example, the account information may be stored locally for use at a time when the user is ready for checkout at the physical location. At block 508e, the account information may autopopulate in an application of the computing device 102. For example, the user may be in the checkout process at the physical location and a PIN or other authentication input may be inputted to the computing device 102 which may cause the account information corresponding to that user to autopopulate in the user interface for checkout.

As an illustrative example, the application may display the names of users who have checked-in recently (e.g., within the past hour) at the physical location. A user may be able to select the name during a checkout and the application may require a user authentication to proceed with checkout. The user authentication input may be entered and the once the computing device 102 verifies that the user authentication input matches the authentication profile corresponding to the account information, the application may autopopulate any billing information, shipping information, and/or other information to allow the user to quickly verify and complete the transaction without requiring the user to take out their mobile phone or wallet.

Figure 6:
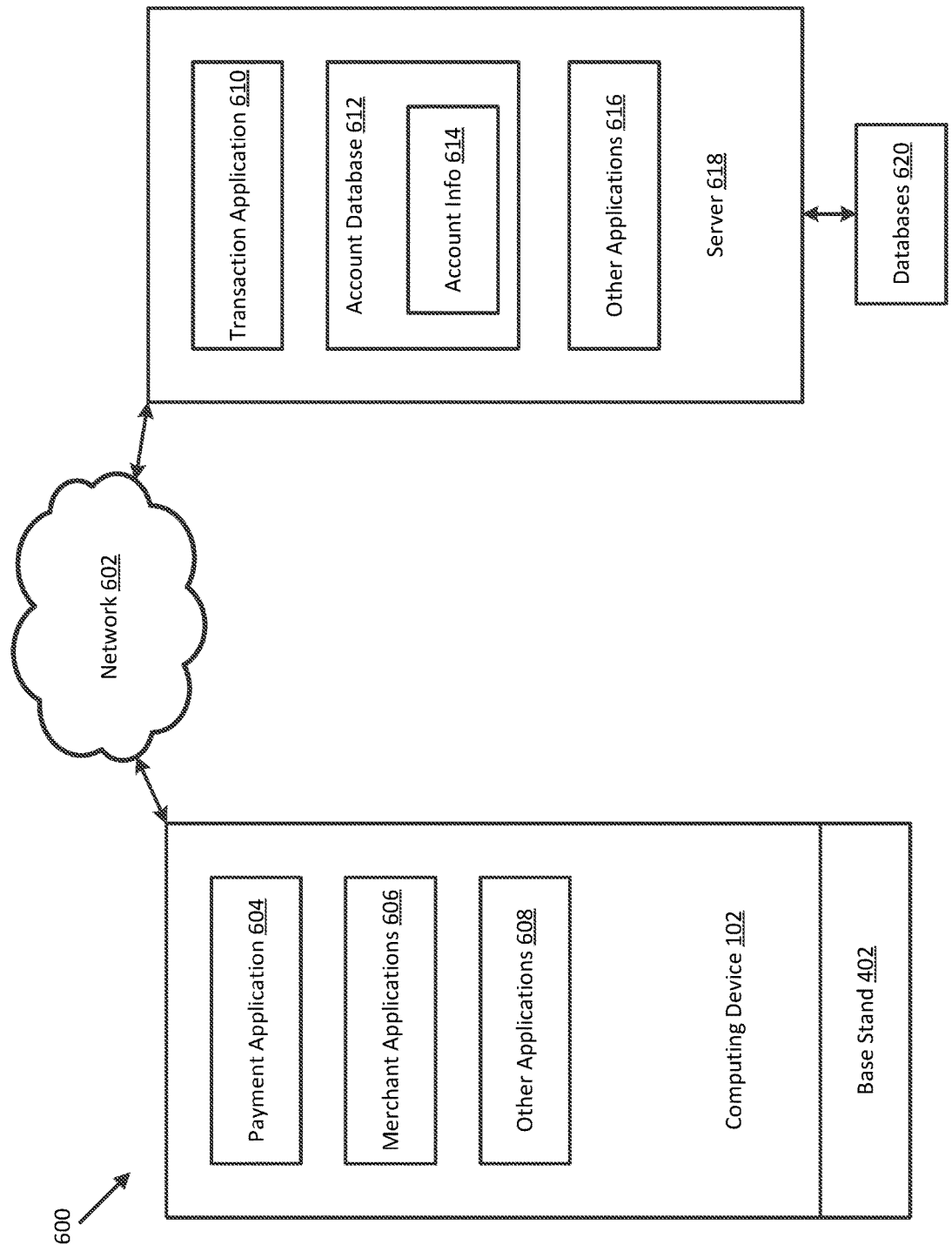
FIG. 6 illustrates a block diagram of a networked system suitable for implementing one or more embodiments of the present disclosure.

FIG. 6 is a block diagram of a networked system 600, consistent with some embodiments. System 600 includes a computing device 102 and a remote server 618 in communication over a network 602. Remote server 618 may be a payment processing service provider server that may be maintained by a payment processing service provider, such as PayPal, Inc. of San Jose, CA. Remote server 618 may be maintained by other service providers in different embodiments. Remote server 618 may also be maintained by an entity with which sensitive credentials and information may be exchanged with computing system 102. Remote server 618 may be more generally a web site, an online content manager, a service provider, such as a bank, or other entity who provides content to a user requiring user authentication or login.

Network 602, in one embodiment, may be implemented as a single network or a combination of multiple networks. For example, in various embodiments, network 602 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Computing device 102, in one embodiment, may be implemented using any appropriate combination of hardware and/or software configured for wired and/or wireless communication over network 602. In particular, computing device 102 may be a device such as that described above with reference to FIGS. 1-4. Consistent with some embodiments, computing device 102 may include any appropriate combination of hardware and/or software having one or more processors and capable of reading instructions stored on a tangible non-transitory machine-readable medium for execution by the one or more processors. Consistent with some embodiments, computing device 102 includes a machine-readable medium, such as a memory (not shown) that includes instructions for execution by one or more processors (not shown) for causing computing device 102 to perform specific tasks. For example, such instructions may include a payment application 604 that may allow a merchant or customer use computing device 102 to authorize a payment. In some embodiments, payment application 604 may be configured to interface with remote server 618 over network 602 to authorize payments processed by remote server 618.

Computing device 102 may also include one or more merchant applications 606. In some embodiments, merchant applications 606 may be applications that allow a merchant or buyer to use computing device 102 in POS system 100. Merchant applications 606 may include any applications that allow a merchant or customer to, scan goods and/or services (collectively referred to as items or products) to create a bill of sale or invoice, and then pay for the items using payment application 604 and/or a card reader, such as card reader 122. Merchant applications 606 may allow a merchant to accept various credit, gift, or debit cards, cash, or payment processing service providers, such as PayPal, Inc., of San Jose, CA, such as may be provided by remote server 618, for payment for items.

Computing device 102 may include other applications 608 as may be desired in one or more embodiments to provide additional features available. For example, applications 608 may include interfaces and communication protocols that allow a merchant or customer receive and transmit information through network 602 and to remote server 618 and other online sites. Applications 608 may also include security applications for implementing client-side security features, programmatic client applications for interfacing with appropriate APIs over network 602 or various other types of generally known programs and/or applications. Applications 608 may include mobile applications downloaded and resident on computing device 102 that enables merchants and customers to access content through applications 608.

Remote server 618, according to some embodiments, may be maintained by an online payment provider or payment processing provider, which may provide processing for online financial and payment transactions on behalf of users including merchants and customers. Remote server 618 may include at least transaction application 610, which may be configured to interact with merchant applications 606 of computing device 102 over network 602 to receive and process transactions. Remote server 618 may also include an account database 612 that includes account information 614 for users having an account on remote server 618, such as a customer or merchant. In some embodiments, transaction application 610 may store and retrieve financial information in account information 614 of account database 612. Remote server 618 may include other applications 616, such as may be provided for authenticating users to remote server 618, for performing financial transactions, and for processing payments. Remote server 618 may also be in communication with one or more external databases 620, that may provide additional information that may be used by remote server 618. In some embodiments, databases 620 may be databases maintained by third parties, and may include third party financial information of merchants and customers.

Although discussion has been made of applications and applications on computing device 102 and remote server 618, the applications may also be, in some embodiments, modules. Module, as used herein, may refer to a software module that performs a function when executed by one or more processors or Application Specific Integrated Circuit (ASIC) or other circuit having memory and at least one processor for executing instructions to perform a function, such as the functions described as being performed by the described applications.

Figure 7:
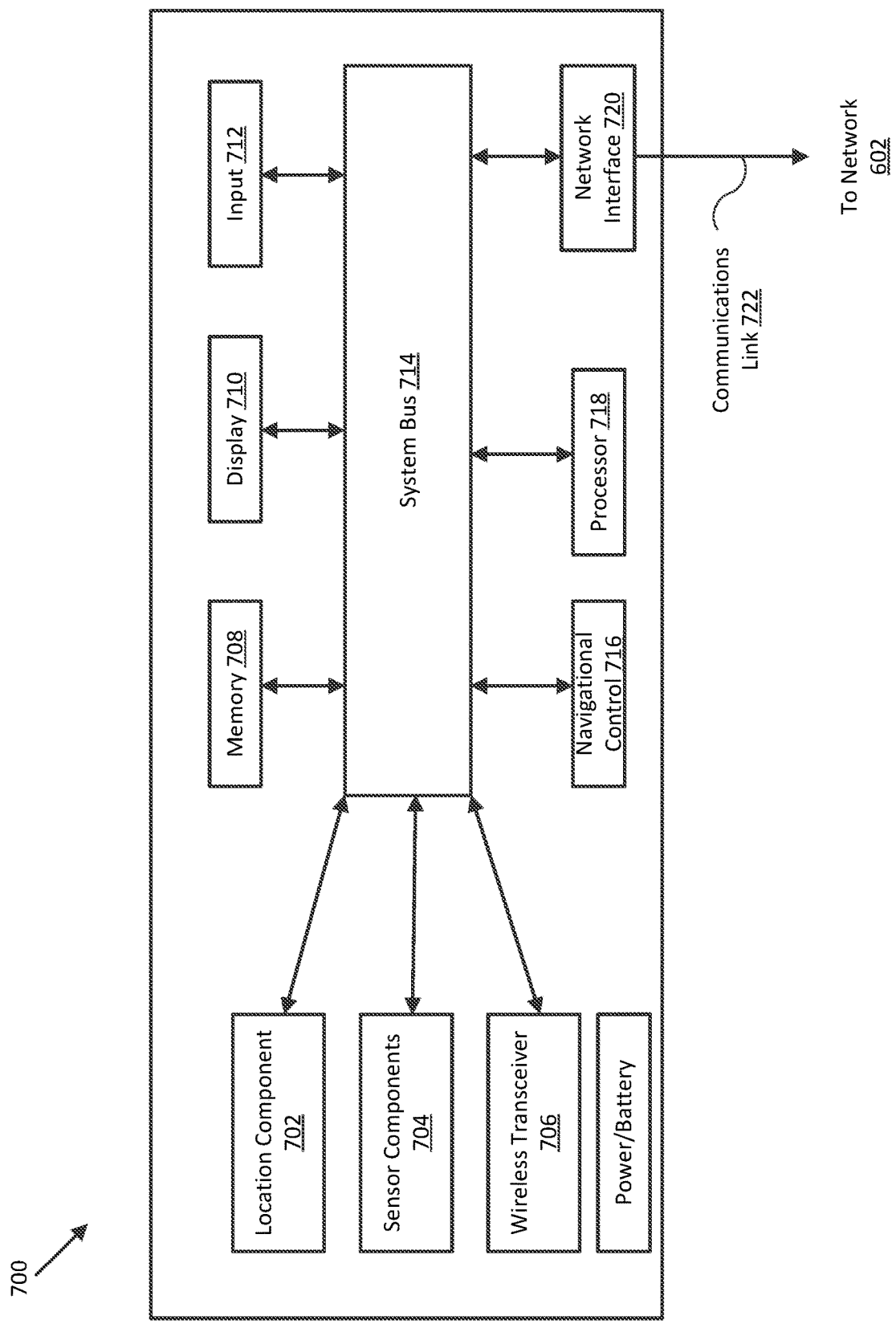
FIG. 7 illustrates a block diagram of a computer system in accordance with one or more embodiments of the present disclosure.

FIG. 7 is a diagram illustrating computing system 700, which may correspond to either of client computing device 102, point-of-sale system 400, base stand 402, or remote server 618, consistent with some embodiments. Computing system 700 may be a mobile device such as a smartphone, a tablet computer, and the like as would be consistent with computing device 102. Further, computing system 700 may also be a server or one server amongst a plurality of servers, as would be consistent with remote server 618. As shown in FIG. 7, computing system 700 includes a network interface component (NIC) 720 configured for communication with a network such as network 602 shown in FIG. 6. Consistent with some embodiments, NIC 720 includes a wireless communication component, such as a wireless broadband component, a wireless satellite component, or various other types of wireless communication components including radio frequency (RF), microwave frequency (MWF), and/or infrared (IR) components configured for communication with network 602. Consistent with other embodiments, NIC 720 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 602.

Consistent with some embodiments, computing system 700 includes a system bus 714 for interconnecting various components within computing system 700 and communicating information between the various components. Such components include a processing component 718, which may be one or more processors, micro-controllers, graphics processing units (GPUs) or digital signal processors (DSPs), and a memory component 708, which may correspond to a random access memory (RAM), an internal memory component, a read-only memory (ROM), or an external or static optical, magnetic, or solid-state memory. Consistent with some embodiments, computing system 700 further includes a display component 710 for displaying information to a user of computing system 700. Display component 710 may be a liquid crystal display (LCD) screen, an organic light emitting diode (OLED) screen (including active matrix AMOLED screens), an LED screen, a plasma display, or a cathode ray tube (CRT) display. Computing system 700 may also include an input component 712, allowing for a user of computing system 700, to input information to computing system 700. Such information could include payment information such as an amount required to complete a transaction, account information, authentication information such as a credential, or identification information. An input component 712 may include, for example, a keyboard or key pad, whether physical or virtual. Computing system 700 may further include a navigation control component 716, configured to allow a user to navigate along display component 710. Consistent with some embodiments, navigation control component 716 may be a mouse, a trackball, or other such device. Moreover, if computing system 700 includes a touch screen, display component 710, input component 712, and navigation control 716 may be a single integrated component, such as a capacitive sensor-based touch screen (e.g., display screen 124).

Computing system 700 may further include a location component 702 for determining a location of computing system 700. In some embodiments, location component 702 may correspond to a GPS transceiver that is in communication with one or more GPS satellites. In other embodiments, location component 702 may be configured to determine a location of computing system 700 by using an internet protocol (IP) address lookup, or by triangulating a position based on nearby telecommunications towers, wireless access points (WAPs), or BLE beacons. Location component 702 may be further configured to store a user-defined location in memory component 708 that can be transmitted to a third party for the purpose of identifying a location of computing system 700. Computing system 700 may also include sensor components 704. Sensor components 704 provide sensor functionality, and may correspond to sensors built into, for example, computing device 102 or sensor peripherals coupled to computing device 102. Sensor components 704 may include any sensory device that captures information related to computing device 102 or a merchant or customer using computing device 102 and any actions performed using computing device 102. Sensor components 704 may include camera and imaging components, accelerometers, biometric readers, GPS devices, motion capture devices, and other devices. Computing system 700 may also include one or more wireless transceivers 706 that may each include an antenna that is separable or integral and is capable of transmitting and receiving information according to one or more wireless network protocols, such as Wi-Fi™, 3G, 4G, HSDPA, LTE, RF, NFC, IEEE 802.11a, b, g, n, ac, or ad, Bluetooth®, BLE, WiMAX, ZigBee®, etc. With respect to computing device 102, wireless transceiver 706 may include a BLE beacon, NFC module, and Wi-Fi router for performing one or more operations discussed herein.

Computing system 700 may perform specific operations by processing component 718 executing one or more sequences of instructions contained memory component 708. In other embodiments, hard-wired circuitry may be used in place of or in combination with software instructions to implement the present disclosure. Logic may be encoded in a computer readable medium, which may refer to any medium that participates in providing instructions to processing component 718 for execution, including memory component 708. Consistent with some embodiments, the computer readable medium is tangible and non-transitory. In various implementations, non-volatile media include optical or magnetic disks, volatile media includes dynamic memory, and transmission media includes coaxial cables, copper wire, and fiber optics, including wires that comprise system bus 714. According to some embodiments, transmission media may take the form of acoustic or light waves, such as those generated during radio wave and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computing system 700. In various other embodiments of the present disclosure, a plurality of computing systems 700 coupled by a communication link 722 to network 602 (e.g., such as a LAN, WLAN, PTSN, and/or various other wired or wireless networks, including telecommunications, mobile, and cellular phone networks) may perform instruction sequences to practice the present disclosure in coordination with one another. Computing system 700 may transmit and receive messages, data and one or more data packets, information and instructions, including one or more programs (i.e., application code) through communication link 1022 and network interface component 720 and/or wireless transceiver 706. Received program code may be executed by processing component 718 as received and/or stored in memory component 708.

Computing system 700 may include more or less components than shown in FIG. 7 according to some embodiments. For example, if computing system 700 corresponds to computing device 102, such as shown in FIGS. 1-4 and not specifically referred to in FIG. 7. Moreover, components shown in FIG. 7 may be directly coupled to one or more other components in FIG. 7, eliminating a need for system bus 714. Furthermore, components shown in FIG. 7 may be shown as being part of a unitary system 700, but may also be part of a distributed system where the components are separate but coupled and in communication. In general, the components shown in FIG. 7 are shown as examples of components in a computing system 700 capable of performing embodiments disclosed herein. However, a computing system 700 may have more or fewer components and still be capable of performing some embodiments disclosed herein.

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A method, comprising:
   determining, at least in part based on electrical connections between electrical contacts of a computing device and electrical contacts of a base stand, that the computing device is electrically coupled to the base stand, the computing device including a user interface and a card reader configured to receive a card and read information from the card;
   accessing, at least in part via an electronic handshake between the base stand and the computing device, a device identifier of the base stand, wherein the electronic handshake is performed using one or more of: the electrical connections between the electrical contacts of the computing device and the electrical contacts of the base stand, a Bluetooth protocol, a Radio Frequency Identification (RFID) protocol, a Near Field Communication (NFC) protocol, or a WiFi protocol;
   determining whether the computing device is authorized to pair with the base stand based on the device identifier, wherein a pairing between the computing device and the base stand enables a sharing of data between the computing device and the base stand; and
   enabling a functionality of the base stand based on a determination that the computing device is authorized to pair with the base stand.

2. The method of claim 1, wherein the determining that the computing device is electrically coupled to the base stand comprises determining that a plurality of first electrical contacts of the computing device are in physical contact with a plurality of second electrical contacts of the base stand.

3. The method of claim 1, wherein the determining whether the computing device is authorized to pair with the base stand based on the device identifier comprises comparing the accessed device identifier with a stored device identifier.

4. The method of claim 1, wherein the functionality comprises an NFC payment functionality of the base stand.

5. The method of claim 1, wherein the functionality comprises a wireless connection functionality that enables the base stand to communicate wirelessly with the computing device.

6. The method of claim 1, wherein the functionality comprises a printing functionality of the base stand.

7. The method of claim 1, wherein the functionality comprises a battery charging functionality of the base stand.

8. The method of claim 1, further comprising:
   determining that a card has been inserted into the computing device; and
   scanning the card that has been inserted into the computing device.

9. The method of claim 1, further comprising:
   determining that the computing device is no longer electrically coupled to the base stand; and
   disabling the functionality based on a determination that the computing device is no longer electrically coupled to the base stand.

10. The method of claim 1, further comprising:
    receiving, from the base stand, account information of a user; and
    automatically populating the user interface of the computing device with the account information of the user.

11. The method of claim 1, further comprising:
    determining whether the computing device is within a threshold area of the base stand; and
    applying, based on a result of the determining whether the computing device is within a threshold area of the base stand, one of a first authentication level or a second authentication level for authenticating a user of the computing device, the second authentication level being different from the first authentication level.

12. The method of claim 11, wherein the determining whether the computing device is within a threshold area of the base stand comprises comparing Global Positioning System (GPS) data of the computing device with a GPS location of the base stand.

13. The method of claim 1, further comprising:
    determining whether the computing device is docked to, or communicatively paired with, the base stand; and
    authenticating a user of the computing device:
    1) based on a determination that the computing device is docked to, and communicatively paired with, the base stand, authenticating the user of the computing device according to a first authentication level;
    2) based on a determination that the computing device is undocked from, but communicatively paired with, the base stand, authenticating the user of the computing device according to a second authentication level that is more stringent than the first authentication level; or
    3) based on a determination that the computing device is undocked from, and not communicatively paired with, the base stand, authenticating the user of the computing device according to a third authentication level that is more stringent than the second authentication level.

14. A system, comprising:
    a user interface;
    a card reader configured for an insertion of a card and for reading electronic information from the card;
    a non-transitory memory; and
    one or more hardware processors coupled to the non-transitory memory and configured to read instructions from the non-transitory memory to cause the system to perform operations comprising:
       accessing, based on an electronic handshake, a device identifier of a base stand electrically coupled to a computing device, wherein the electronic handshake is performed using one or more of: a physical connection between the computing device and the base stand, a Bluetooth protocol, a Radio Frequency Identification (RFID) protocol, a Near Field Communication (NFC) protocol, or a WiFi protocol;

determining whether the computing device is authorized to pair with the base stand based on the device identifier, wherein a pairing between the computing device and the base stand allows data to be shared between the computing device and the base stand; and enabling a functionality of the base stand based on a determination that the computing device is authorized to pair with the base stand.

15. The system of claim 14, wherein the enabling the functionality comprises enabling an NFC payment functionality of the base stand, enabling a wireless connection functionality of the base stand, enabling a printing functionality of the base stand, or enabling a battery charging functionality of the base stand.

16. The system of claim 14, wherein the operations further comprise:

receiving, from the base stand, account information of a user; and automatically populating, on the user interface, the account information of the user.

17. The system of claim 14, wherein the operations further comprise: authenticating a user of the computing device according to one of a plurality of different authentication levels, wherein the authenticating is based at least in part on a determination of a geographical location of the computing device relative to a geographical location of the base stand.

18. The system of claim 14, wherein the operations further comprise: authenticating a user of the computing device according to one of a plurality of different authentication levels, wherein the authenticating is based at least in part on a determination of a docking status or a pairing status of the computing device with respect to the base stand.

19. A system, comprising:

a base stand having a docking interface, wherein the base stand has one or more activatable functionalities; and a computing device that is dockable with the base stand by establishing electrical connections with the docking interface, wherein the computing device includes a user interface and a card reader configured to read electronic information from a card inserted therein, wherein the computing device is configured to perform operations that include:

accessing a device identifier of the base stand docked with the computing device, wherein the device identifier is accessed through an electronic handshake between the base stand and the computing device;

determining whether the computing device is authorized to pair with the base stand based on the device identifier; and based on a determination that the computing device is authorized to pair with the base stand, enabling a sharing of data between the computing device and the base stand and at least one of the one or more activatable functionalities of the base stand.

20. The system of claim 19, wherein the one or more activatable functionalities comprises a Near Field Communication (NFC) payment functionality of the base stand, a wireless connection functionality of the base stand, a printing functionality of the base stand, or a battery charging functionality of the base stand.

* * * * *